(12) United States Patent
Hashimoto et al.

(10) Patent No.: US 8,235,449 B2
(45) Date of Patent: Aug. 7, 2012

(54) ROOF OPENING STRUCTURE FOR VEHICLE

(75) Inventors: Satoru Hashimoto, Hiroshima (JP); Shigeyuki Mori, Hiroshima (JP); Yukio Nakamura, Hiroshima (JP)

(73) Assignee: Mazda Motor Corporation (JP)

( * ) Notice: Subject to any disclaimer, the term of this patent is extended or adjusted under 35 U.S.C. 154(b) by 98 days.

(21) Appl. No.: 12/635,852

(22) Filed: Dec. 11, 2009

(65) Prior Publication Data

US 2010/0148541 A1 Jun. 17, 2010

(30) Foreign Application Priority Data

| Dec. 12, 2008 | (JP) | 2008-316617 |
| Dec. 12, 2008 | (JP) | 2008-316618 |
| Jan. 19, 2009 | (JP) | 2009-008364 |
| Jan. 19, 2009 | (JP) | 2009-008365 |
| Jan. 22, 2009 | (JP) | 2009-011506 |

(51) Int. Cl.
*B60J 7/20* (2006.01)

(52) U.S. Cl. ............................... 296/136.05

(58) Field of Classification Search ........... 296/136.05, 296/136.04, 136.06, 136.12, 136.13, 108, 296/107.16, 107.17, 107.2

See application file for complete search history.

(56) References Cited

U.S. PATENT DOCUMENTS

| 4,516,803 | A |   | 5/1985 | Kaltz et al. |
| 5,018,780 | A |   | 5/1991 | Yoshii et al. |
| 5,520,432 | A | * | 5/1996 | Gmeiner et al. .......... 296/107.01 |
| 5,542,735 | A | * | 8/1996 | Furst et al. ................ 296/107.18 |
| 5,647,630 | A | * | 7/1997 | Jambor et al. ................ 296/108 |
| 5,810,424 | A | * | 9/1998 | Kuttner et al. .............. 296/180.1 |
| 6,296,295 | B1 | * | 10/2001 | Jambor et al. ............ 296/146.14 |
| 6,390,531 | B1 | * | 5/2002 | Schutt ...................... 296/107.13 |
| 6,557,921 | B2 | * | 5/2003 | Wezyk et al. ............. 296/107.07 |
| 6,582,009 | B2 | * | 6/2003 | Wezyk et al. .............. 296/180.1 |
| 6,702,362 | B2 | * | 3/2004 | Eichholz et al. .............. 296/108 |
| 6,739,645 | B2 | * | 5/2004 | Papendorf et al. ............ 296/108 |
| 6,848,736 | B2 | * | 2/2005 | Guillez .................... 296/107.08 |
| 6,857,684 | B2 | * | 2/2005 | Worley .................... 296/100.06 |
| 6,857,695 | B2 | * | 2/2005 | Stoffels et al. ................ 296/218 |
| 6,866,327 | B2 | * | 3/2005 | Willard ..................... 296/136.06 |

(Continued)

FOREIGN PATENT DOCUMENTS

DE       10 2006 055 276 A1    5/2008

(Continued)

OTHER PUBLICATIONS

Extended European Search Report dated Mar. 26, 2010; Application No. 09015140.8-1268.

*Primary Examiner* — Kiran B Patel

(74) *Attorney, Agent, or Firm* — Studebaker & Brackett PC; Donald R. Studebaker

(57) ABSTRACT

A roof is split into plural parts, a front roof and a rear roof. A roof-storage space is formed between a passenger's seat and a rear bulkhead which forms a rear end of a vehicle compartment, in which the roof is stored when the roof is open. There is provided a support mechanism which substantially horizontally supports the roof which is stored in the roof-storage space so that an upper space of the roof-storage space between the passenger's seat and the bulkhead is covered with only one of the plural parts of the roof.

12 Claims, 25 Drawing Sheets

U.S. PATENT DOCUMENTS

| | | | |
|---|---|---|---|
| 6,921,122 B2 * | 7/2005 | Obendiek et al. | 296/107.07 |
| 6,955,388 B2 * | 10/2005 | Hasselgruber et al. | 296/108 |
| 7,128,362 B2 * | 10/2006 | Telehowski | 296/107.08 |
| 7,140,666 B2 * | 11/2006 | Wulf et al. | 296/124 |
| 7,347,482 B2 * | 3/2008 | Powell | 296/107.08 |
| 7,384,067 B2 * | 6/2008 | Parks et al. | 280/756 |
| 7,597,380 B1 * | 10/2009 | Adjwok | 296/107.08 |
| 7,669,912 B2 * | 3/2010 | Brockhoff | 296/108 |
| 7,677,635 B2 * | 3/2010 | Brockhoff | 296/108 |
| 7,690,684 B2 * | 4/2010 | Tobaru et al. | 280/756 |
| 7,708,333 B2 * | 5/2010 | Kracht | 296/108 |
| 7,802,837 B2 * | 9/2010 | Schulz et al. | 296/124 |
| 7,819,459 B2 * | 10/2010 | Kinnanen et al. | 296/107.08 |
| 7,862,099 B2 * | 1/2011 | Hayashi et al. | 296/107.08 |
| 7,959,206 B2 * | 6/2011 | Hinrichs et al. | 296/107.08 |
| 2005/0011640 A1 * | 1/2005 | Tohda et al. | 165/202 |
| 2005/0035624 A1 * | 2/2005 | Krohle | 296/107.07 |
| 2007/0170748 A1 * | 7/2007 | Wolf | 296/108 |
| 2008/0100090 A1 * | 5/2008 | Riabov et al. | 296/107.17 |
| 2010/0019531 A1 * | 1/2010 | Noda et al. | 296/107.07 |
| 2011/0095575 A1 * | 4/2011 | Hashimoto et al. | 296/220.01 |

FOREIGN PATENT DOCUMENTS

| | | |
|---|---|---|
| JP | 2005-186688 A | 7/2005 |
| JP | 2006-021607 A | 1/2006 |
| JP | 2007-261412 A | 10/2007 |

* cited by examiner

ROOF OPENING STRUCTURE FOR VEHICLE

BACKGROUND OF THE INVENTION

The present invention relates to a roof opening structure for a vehicle, in particular, a so-called open car, which comprises a front header extending in a vehicle width direction in front of a passenger's seat arranged in a vehicle compartment and supporting an upper side of a windshield and an openable roof extending rearward from the front header and forming an upper portion of the vehicle compartment.

In general, the so-called open car with the openable roof comprises a roll bar to protect a passenger's head when the roof is open at a vehicle rollover. This conventional open car equipped with the roll bar is disclosed in Japanese Patent Laid-Open Publication Nos. 2005-186688 or 2006-21607, for example.

The structure disclosed in these publications comprises a kick-up portion which rises upward obliquely from a rear portion of a floor panel, a rear floor which extends rearward from an upper end of the kick-up portion, and a cross member which extends in a vehicle width direction over a back face of the kick-up portion and a lower face of a front end portion of the rear floor. Further, a cross bar which has a closed cross section and extends in the vehicle width direction is provided so as to interconnect both-sides side panels forming the vehicle side via link brackets.

Moreover, behind a seatback of a driver's seat and a seatback of a passenger's seat is provided a pair of roll bars which rises upward from an upper face of the front end portion of the rear floor which corresponds to the above-described cross member. Respective middle portions of the roll bars extend upward through the cross bar and bend in a reverse-U shape, and their ends are fixed to the cross bar. Additionally, the roll bar and the both side panels are interconnected by connecting members which extend in the vehicle width direction. Thus, the support rigidity of the roll bar is ensured.

The above-described roll bars are made of a steel pipe, so that they can have a sufficient rigidity itself and supporting rigidity. Further, the roll bars extend vertically as a whole, and the upper end of the roll bars are positioned substantially at the same level as the upper end of the seat Accordingly, since the high roll bars are arranged right behind the seat, the roof forming the upper portion of the vehicle compartment may be required to be foldable longitudinally. Thus, the roof opening structure for a vehicle to meet this requirement, like the one which is disclosed in Japanese Patent Laid-Open Publication No. 2007-261412, has been invented.

According to the roof opening structure for a vehicle disclosed in this publication, the roof is split into three parts, i.e., a front roof panel, a middle roof panel, and a back window. Further, a deck cover is provided so as to cover these roof members which are folded and stored in a storage compartment for providing a good appearance. Herein, the above-described deck cover is retreated rearward, and then the roof is folded and stored in the storage compartment. After the storage of the roof, the deck cover is moved forward again to its normal covering position.

According to the above-described structure disclosed in the publication, while the roof can be folded compactly longitudinally because the roof is comprised of three split members, the structure may be rather complex and the above-described deck cover may be necessary to ensure the good appearance, which may further cause the more complex structure. Thus, there are problems in that the structure would become too complex, the number of parts would become too many, the weight of the structure would become too heavy, and the costs of the structure would increase improperly.

SUMMARY OF THE INVENTION

Accordingly, an object of the present invention is to provide a roof opening structure for a vehicle which can provide a properly simple and light structure of the roof without any conventional deck cover.

According to the present invention, there is provided a roof opening structure for a vehicle, comprising a front header extending in a vehicle width direction in front of a passenger's seat arranged in a vehicle compartment and supporting an upper side of a windshield, a roof extending rearward from the front header and forming an upper portion of the vehicle compartment, the roof being split into plural parts and openable, a roof-storage space formed between the passenger's seat and a rear bulkhead forming a rear end of the vehicle compartment, in which the roof is stored when the roof is open, and a support mechanism substantially horizontally supporting the roof which is stored in the roof-storage space so that an upper space of the roof-storage space between the passenger's seat and the rear bulkhead is covered with only one of the plural parts of the roof.

According to the present invention, since the upper space of the roof-storage space between the passenger's seat and the rear bulkhead is covered with only one of the split parts of the roof when the roof is open and stored in the roof-storage space, the properly simple and light structure of the roof without any conventional deck cover can be provided. In other words, the above-described one of the split parts of the roof performs the function of the conventional deck cover, so that any conventional deck cover may be omitted. Further, the upper of the roof-storage space is covered only with this one of the split parts of the roof, so that the appearance can be improved.

According to an embodiment of the present invention, the roof comprises a front roof and a rear roof which are split from each other, and the rear roof is positioned inside the roof-storage space and the front roof is positioned above the rear roof and covers over the roof-storage space. Thereby, since the roof is split into the front roof and the rear roof, the roof structure can be made simple. Further, since the rear roof is stored inside the roof-storage space and the roof-storage space is covered with the front roof, specifically, the front roof covers the space between the seat and the rear bulkhead substantially horizontally, the good appearance can be provided.

According to another embodiment of the present invention, the roof is configured so that the rear roof is moved upside down and stored inside the vehicle compartment and the front roof is moved rearward and above the rear roof, keeping a position thereof, and covers over the roof-storage space. Thereby, since the rear roof is moved upside down and stored inside the vehicle compartment, the support mechanism can be made simple and the roof-storage space can be made compact.

According to another embodiment of the present invention, the front roof is supported by the supporting mechanism so as to be moved rearward, keeping a forward-slant position thereof. Thereby, since the front roof can be kept in the forward-slant position during its rearward move, the front roof may not receive traveling winds improperly. Consequently, the roof can be properly operated even during the vehicle's traveling at a low speed, thereby improving the facility.

According to another embodiment of the present invention, a rollover protecting member is provided at a vehicle-body rear deck portion, the height of the rollover protecting member being set so that a line connecting an upper end of the rollover protecting member and an upper end of the front header is positioned so as to protect an passenger in the vehicle compartment. Thereby, the vertical length of the rollover protecting member can be properly short to aim at the small size, so the light weight of the rollover protecting member can be achieved. Further, in case of the vehicle rollover when the roof is in the open state, the vehicle may be supported by the front header and the rollover protecting members, thereby ensuring the safety of the passenger. Moreover, since the rollover protecting members are provided at the rear deck portion, the vehicle compartment can be made spacious and also the rollover protecting members can be properly provided. Consequently, the vehicle compartment can be used widely and the passenger can be protected properly by the rollover protecting members. In addition, the vertical length of the rollover protecting member is properly short, so the appearance can be improved from the design aspect and the better rear view can be ensured.

According to another embodiment of the present invention, the height of the rollover protecting member is set so that the line connecting the upper end of the rollover protecting member and the upper end of the front header is positioned at a level higher than an upper end of the seat. Herein, the upper end of the seat may be set to an upper end of the seatback, or an upper end of a headrest portion of the seatback in case of the seatback having a headrest which is integrally formed with the seatback. Accordingly, since the passenger's seat is set so as to correspond to the size of the passenger, the passenger can be protected surely at the vehicle rollover by setting the height of the rollover protecting member.

According to another embodiment of the present invention, the rollover protecting member comprises a member which extends in the vehicle width direction. Thereby, the passenger can be surely protected by the rollover protecting member extending in the vehicle width direction even in case the vehicle rolls over in various manners, and the rigidity of the vehicle body can be increased properly with this protecting member.

According to another embodiment of the present invention, the rollover protecting member comprises plural members which are away from each other in the vehicle width direction. Thereby, the passenger can be surely protected by the rollover protecting member comprising the plural members even in case the vehicle rolls over in various manners as well.

According to another embodiment of the present invention, the vehicle-body rear deck portion comprises a rear deck member which is a rigidity member extending in the vehicle width direction, and the rollover protecting member is provided at a position which corresponds to the rear deck member. Thereby, the support rigidity of the rollover protecting member can be ensured, and the light weight caused by the compact structure can be achieved.

According to another embodiment of the present invention, the rollover protecting member is provided at the vehicle-body rear deck portion which is positioned above a rear wheel house. Thereby, the rollover protecting member is arranged at a position which corresponds to the rear wheel house, so that the rigidity of the rollover protecting member can be ensured. In particular, the rigidity can be ensured by using the existing vehicle-body structure (rear wheel house), so that both the compactness and the light weight can be achieved.

According to another embodiment of the present invention, an upper end of a damper which is coupled to a rear wheel is supported at an upper portion of the rear wheel house. Thereby, since the rigidity of the damper itself is high and the strength of the damper support portion is high, the reinforcement of the rollover protecting member can be achieved by using this damper support portion.

According to another embodiment of the present invention, a wheel-house reinforcement is provided at the rear wheel house. Thereby, the rollover protecting member is provided at a position which corresponds to the reinforced wheel-house reinforcement, so that the rigidity of the rollover protecting member can be further increased.

According to another embodiment of the present invention, there is provided a rear side gusset which extends vertically and interconnects a side portion of the rear bulkhead and a rear side panel which forms a side portion of the vehicle compartment. Thereby, improvements of resistance against the vehicle side crash, vehicle-body rigidity and vehicle-body torsional rigidity can be achieved without any conventional cross bar. Further, since no cross bar is provided, the roof-storage space can be properly enlarged.

According to another embodiment of the present invention, the rear side gusset includes a closed cross section which is formed by the rear bulkhead and the rear side panel. Thereby, the vehicle-body rigidity can be further improved.

According to another embodiment of the present invention, a rear cross member which extends in the vehicle width direction is provided at the rear bulkhead, and the rear side gusset is provided at a position which corresponds to a side end portion of the rear cross member. Thereby, the vehicle-body rigidity can be improved, in particular, the impact load caused by the vehicle side crash can be transmitted to the rear cross member properly, thereby achieving the improvement of the resistance against the vehicle side crash. Further, the vehicle-body rigidity can be further improved by a synergy effect of the rear cross member and the rear side gusset.

According to another embodiment of the present invention, the rear side gusset extends vertically along the rear side panel and includes an extension portion which extends in the vehicle width direction along the rear cross member. Thereby, the extension portion with a laterally long span receives the side-impact load, so that the resistance against the vehicle side crash can be improved and the improvements of the vehicle-body rigidity and the vehicle-body torsional rigidity can be achieved.

According to another embodiment of the present invention, the rear side gusset includes a retreat portion at an inside portion thereof which prevents an interference thereof with the roof which is stored in the roof-storage space. Thereby, any improper interference between the roof stored in the roof-storage space and the rear side gusset can be prevented.

According to another embodiment of the present invention, a door is provided at the side of the vehicle compartment, and a rear end of a door impact bar which extends longitudinally inside the door is provided so as to overlap with the rear side gusset when viewed from the side. Thereby, the door can be prevented from moving inward improperly at the vehicle side crash. Further, the impact load caused by the vehicle side crash can be transmitted to the rear side gusset properly, thereby achieving the further improvement of the resistance against the vehicle side crash.

According to another embodiment of the present invention, there is provided a rear side gusset which extends upward from the rear bulkhead and a shoulder anchor of a seatbelt for a passenger seated in the passenger's seat is fixed to the rear side gusset. Thereby, providing the roof-storage space and the shoulder anchor can be achieved. Further, the vehicle-body rigidity can be improved by the rear side gusset. Moreover, since the shoulder anchor is fixed to the rear side gusset as a reinforcement member, the strength of the shoulder anchor can be increased.

According to another embodiment of the present invention, there is provided a shoulder anchor bracket which is connected to the rear side gusset at a front portion thereof and extends rearward, and the shoulder anchor is provided at the shoulder anchor bracket. Thereby, ensuring a proper disposition angle of the seatbelt relative to the passenger and a strong support rigidity of the shoulder anchor can be achieved.

According to another embodiment of the present invention, a retractor device which winds up the seatbelt is attached to a kick-up portion which rises upward from a floor panel. Thereby, the retractor device can be arranged at a proper position from the space standpoint, and the support rigidity of the retractor device can be ensured.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
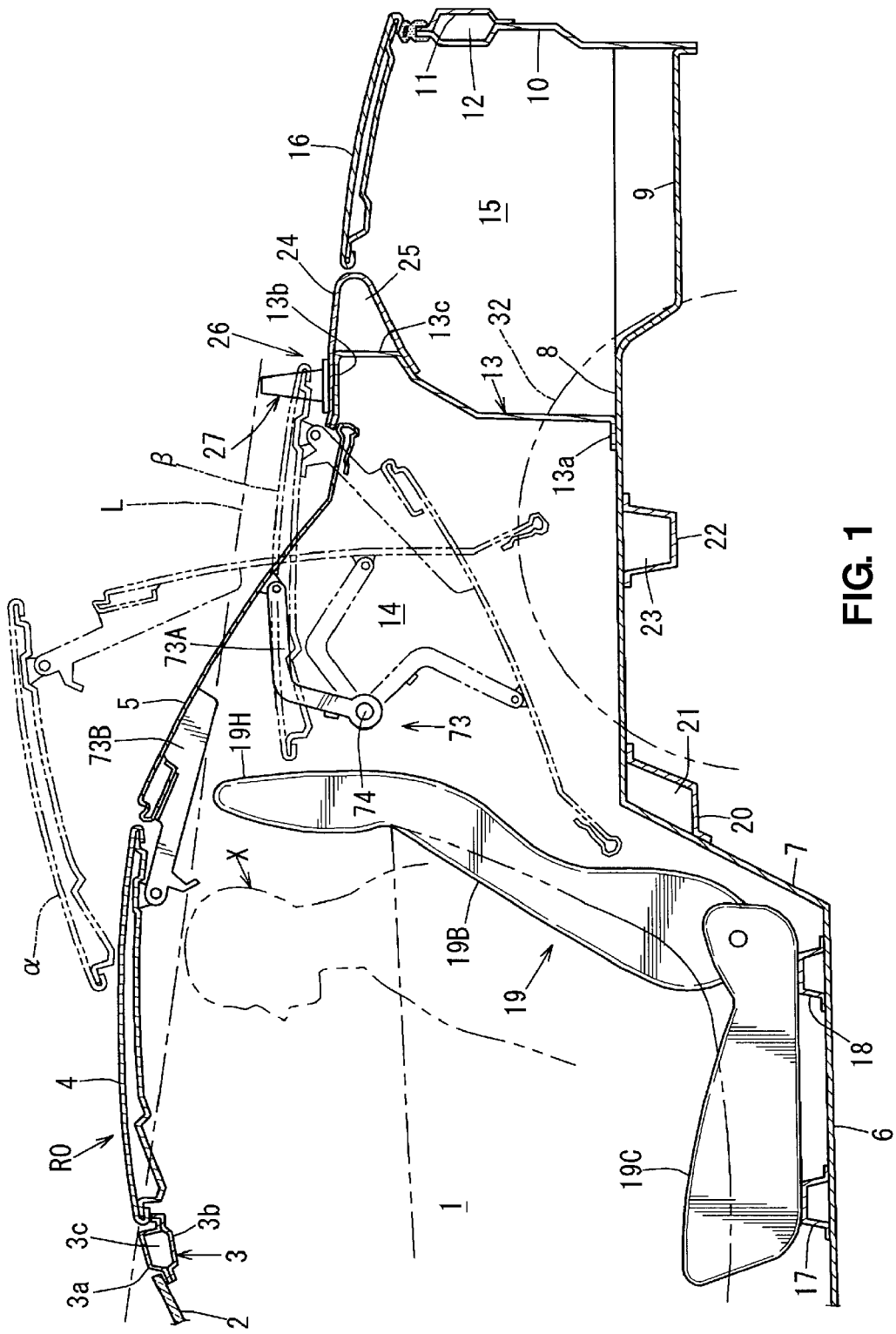
FIG. 1 is a side view showing a roof opening structure for a vehicle according to a first embodiment of the present invention.

A first embodiment of the present embodiment will be described. In a side view of FIG. 1 which shows a roof opening structure of a so-called open car according to the present embodiment, this open car comprises a front header 3 which extends in a vehicle width direction supports an upper side of a windshield 2 at a front portion of a vehicle compartment 1, and a roof RO which extends rearward from the front header 3 and forms an upper portion of the vehicle compartment 1. The roof RO is split into a front roof 4 and a rear roof 5, which are supported to be openable. In FIG. 1, the roofs 4, 5 in the closed state are illustrated by solid lines, the roofs 4, 5 in the middle state of roof opening are illustrated by two-dotted broken lines α, and the roofs 4, 5 in the open state in which they are stored in a roof-storage space 14, which will be described below, are illustrated by two-dotted broken lines β.

Herein, the front header 3 is formed by a front header outer 3a and a front header inner 3b which are joined to each other, and it has closed cross section 3c which extends in the vehicle width direction. Both ends of the front header 3 are connected to hinge pillars via respective front pillars which have a structure with a closed cross section (not illustrated). Herein, the front pillars and the hinge pillars are vehicle-body rigidity members which have a structure with a closed cross section, respectively.

Meanwhile, a floor panel 6 which forms a bottom face of the vehicle compartment 1 is provided. A rear floor 8 which extends substantially horizontally is connected to a rear portion of the floor panel 6 via a kick-up portion 7 which rises upward and rearward obliquely. A concave spare tire pan 9 is formed at a middle are of a rear portion of the rear floor 8. A rear end panel 10 which extends vertically is attached to the rear end of the rear floor 8. A rear end member 11 which extends in the vehicle width direction is joined to the outside of an upper portion of the rear end panel 10. A rear end closed cross section 12 is formed between the rear end member 11 and the rear end panel 10 so as to extend in the vehicle width direction, which increases the rigidity of a vehicle rear portion.

Further, a rear bulkhead 13 which forms the rear end of the vehicle compartment 1 is attached to a middle portion of the rear floor 8 in a longitudinal direction of the vehicle. The rear bulkhead 13 extends vertically and forms the roof-storage space 14 which is positioned in front of it. Specifically, the roof-storage space 14 which stores the roof RO is formed between a passenger's seat 19, which will be described later, and the rear bulkhead 13. Further, a baggage space, i.e., a trunk room 15 is formed behind the rear bulkhead 13. A trunk lid 16 opens or closes an upper portion of the trunk room 15.

The roof-storage space 14 is provided at the rear portion of the vehicle compartment 1, and it is a storage portion to store the rear roof 5 when the roof is open, as shown by the two-dotted broken line in FIG. 1. Herein, the rear bulkhead 13 has a joining piece 13a which bends forward at its lower end, and a bend portion 13b which bends forward at its upper end. An upper portion of the rear bulkhead 13 is formed by a U-shaped portion 13c which includes the bend portion 13b, which can increase the rigidity itself.

Meanwhile, the seat 19 (passenger's seat) in which a passenger is seated is provided on the floor panel 6 via plural seat brackets 17, 18 (or a cross member). The seat 19 comprises a seat cushion 19C and a seatback 19B which is equipped with a headrest 19H. Herein, this car is a two-passenger car equipped with a driver's seat and a passenger's seat. The above-described front header 3 forms a rigidity member which extends in the vehicle width direction in front of the seat 19 arranged in the vehicle compartment 1, and supports an upper side of the windshield 2.

Moreover, a cross member 20 which extends in the vehicle width direction is attached to a corner portion of the back face of the kick-up portion 7 and the front lower face of the rear floor 8 so that a closed cross section 21 is formed among the members 7, 8 and 20. Thus, the rigidity of the vehicle-body lower portion can be increased.

Further, a rear cross member 22 which extends in the vehicle width direction is attached to the lower face of a middle portion of the rear floor 8 so that a closed cross section 23 is formed between the rear floor 8 and the rear cross member 22 to increase the rigidity of the vehicle-body lower portion. A sub frame, not illustrated, is attached to a lower portion of the rear cross member 22.

A rear deck member 24 is fixed to the above-described U-shaped portion 13c of the rear bulkhead 13 so as to cover the U-shaped portion 13c from behind, so that a rear-deck closed cross section 25 which extends in the vehicle width direction is formed between the rear bulkhead 13 and the rear deck member 24 to increase the rigidity of a vehicle-body rear deck portion 26. Herein, the rear deck member 24 is formed so as to have a U-shaped or V-shaped section which has an opening on the front. Thus, the rear deck member 24 which is a rigidity member extending in the vehicle width direction is provided at the rear deck portion 26.

Figure 2:
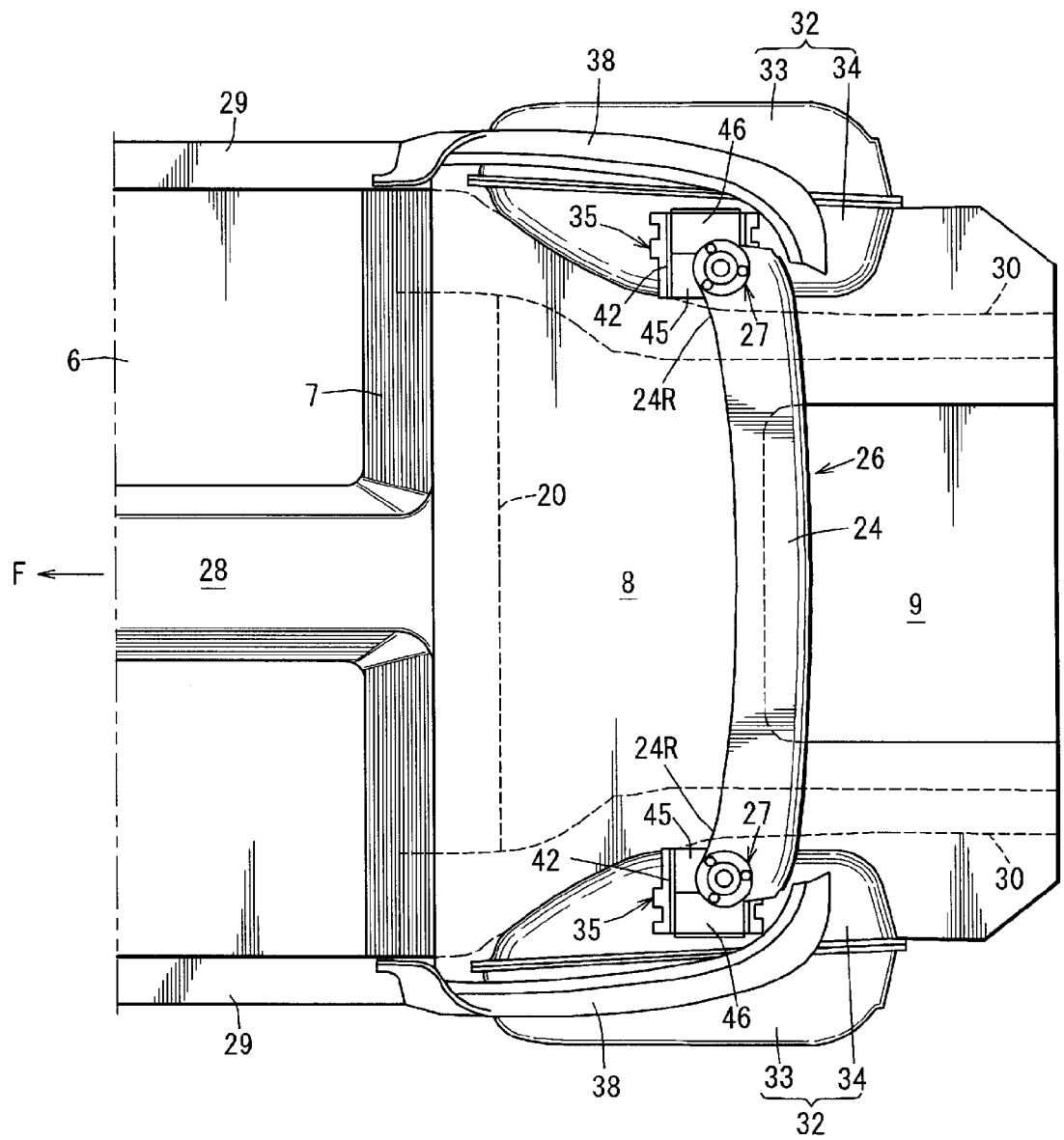
FIG. 2 is a plan view of a major portion of FIG. 1.
Figure 6:
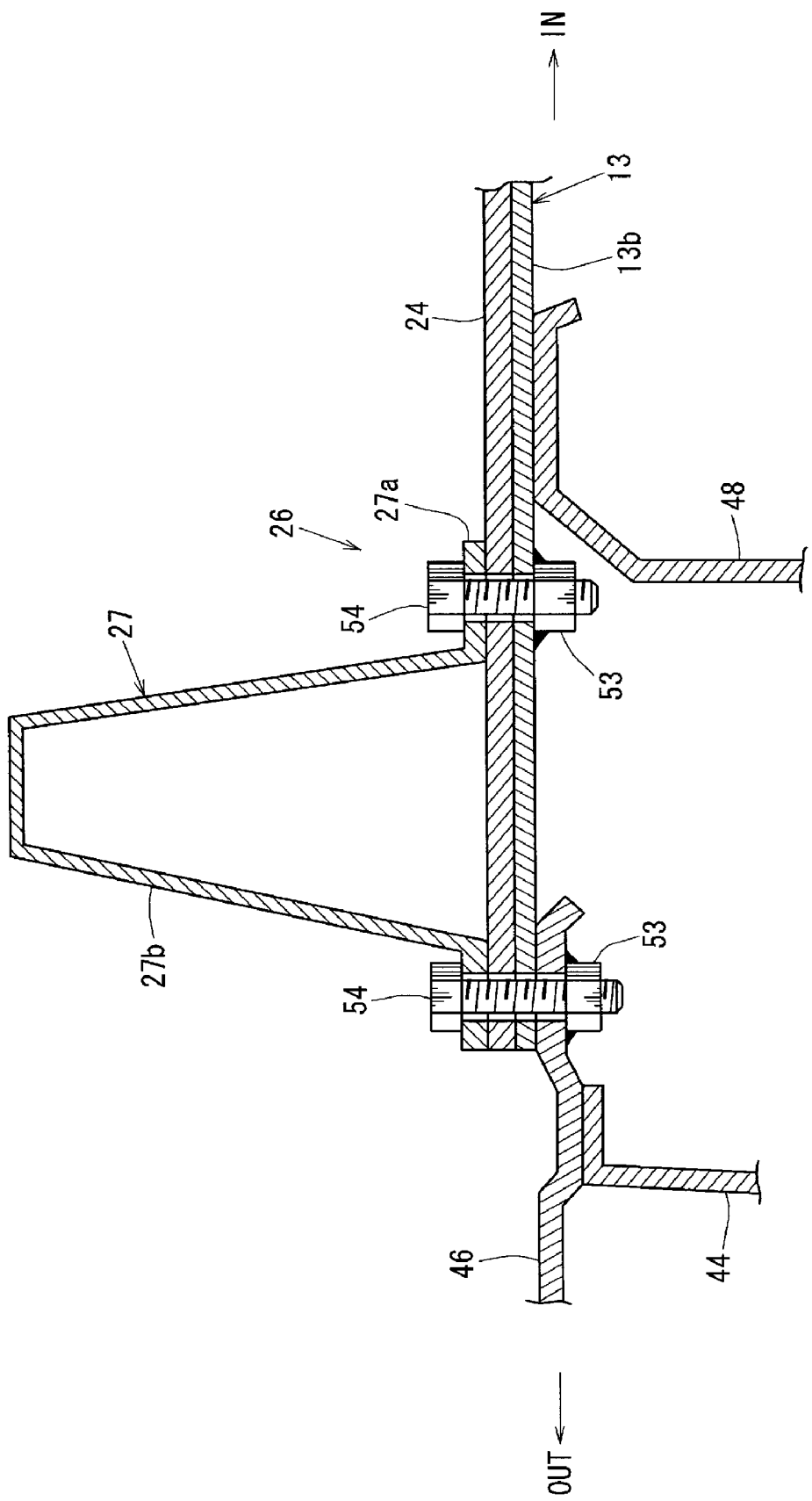
FIG. 6 is a partial enlarged sectional view of FIG. 3.

As shown in FIG. 2 which is a plan view of a major portion of FIG. 1, the rear deck member 24 extends in the vehicle width direction, and its both ends bend forward and have forward bend portions 24R, 24R. Rollover protecting members 27, 27 are attached to upper portions of the forward bend portions 24R, 24R. The rollover protecting members 27, which are made of a hollow member as shown in FIG. 6, support the vehicle together with the front header 3 at the vehicle rollover, which ensures the safety of the passenger. For this purpose, the height of the rollover protecting member 27 is set so that a line L connecting the upper end of the rollover protecting member 27 and the upper end of the front header 3 can be positioned so as to protect the passenger X as shown in FIG. 1.

Specifically, as shown in FIG. 1, the height of the rollover protecting member 27 is set so that this line L is positioned at a level higher than the upper end of the seatback 19B (the upper end of the headrest 19H) of the seat 19 in the vehicle compartment 1. Further, the plural rollover protecting members 27, 27 (two members according to the present embodiment in FIG. 2) is arranged at the both sides behind the roof-storage space 14, and these members 27, 27 are attached to the forward bend portions 24R, 24R of the rear deck member 24.

In FIG. 2, a tunnel portion 28 is formed at the middle portion of the floor panel 6. The tunnel portion 28 projects toward the vehicle compartment 1 and extends longitudinally. Side sills 29, 29 having a structure with a closed cross section respectively are fixed to the right and left sides of floor panel 6, respectively. The side sill 29 is formed by a side sill inner and a side sill outer which are joined to each other, and extends longitudinally. Between the side sill inner and the side sill outer is formed a side-sill closed cross section which extends longitudinally.

Further, rear side frames 30, 30 which extend longitudinally are fixed to the both sides of a lower portion of the rear floor 8. A rear-side closed cross section 31 (see FIG. 3) is formed between the rear floor 8 and the rear side frame 30 so as to extend longitudinally, thereby increasing the rigidity of the vehicle-body lower portion.

Right and left rear wheel houses 32, 32 are formed on the outside of the rear side frames 30, 30 as shown in FIG. 2. Each wheel house 32 is made by a wheel house outer 33 and a wheel house inner 34 which are joined to each other.

As shown in FIGS. 1 and 2, the rollover protecting members 27 are arranged on the rear deck portion 26 above the rear wheel houses 32 in back of the vehicle compartment 1. A wheel-house reinforcement 35 is provided at the rear wheel house 32 for reinforcement. The above-described rollover protecting member 27 is provided at a position which corresponds to the wheel-house reinforcement 35, so hereinafter, the structure of the wheel-house reinforcement 35 and its surroundings will be described in detail referring to FIGS. 3 and 4.

Figure 3:
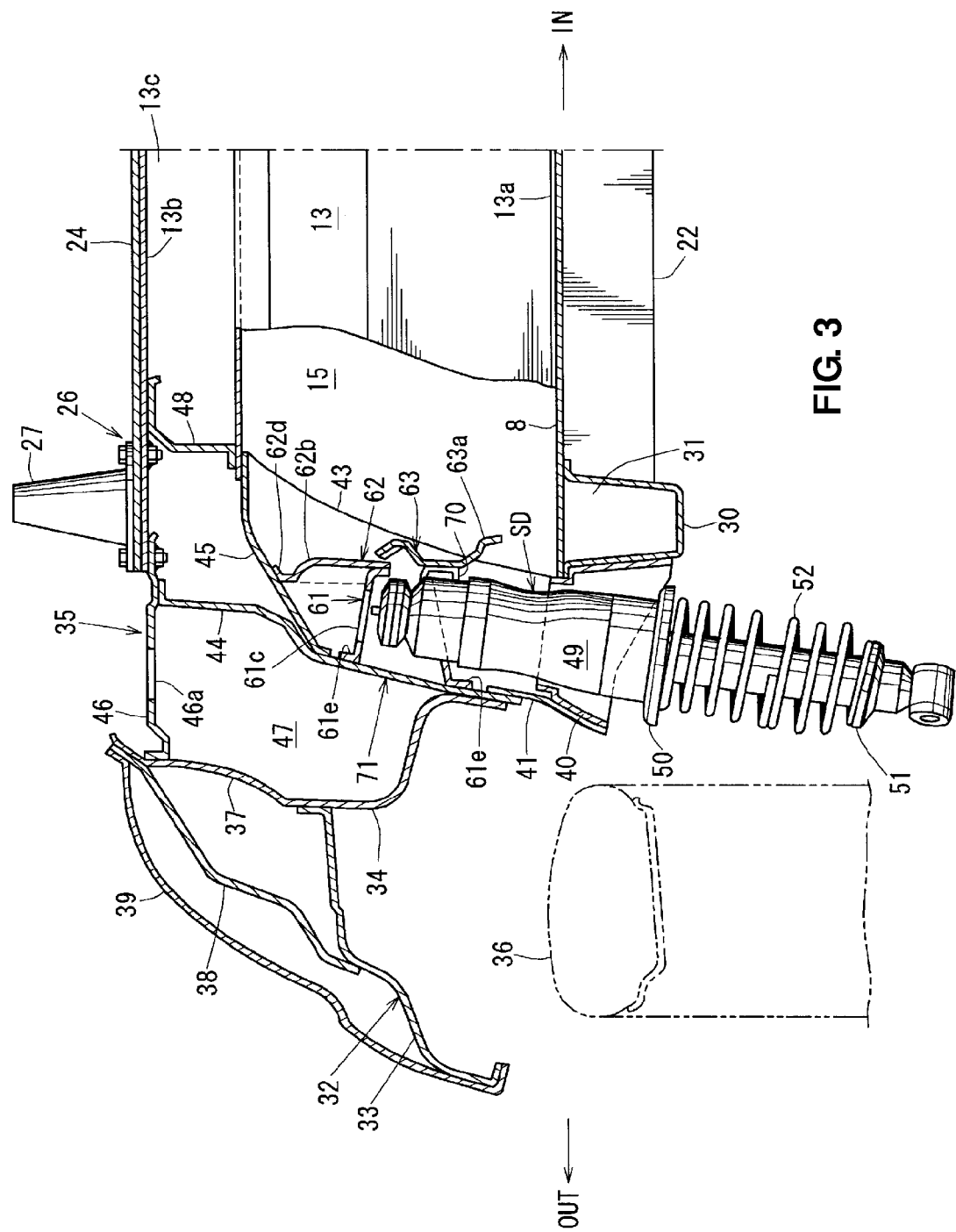
FIG. 3 is an elevation view showing a disposition structure of a rollover protecting member.

As shown in FIG. 3, the rear wheel house 32 of a rear wheel 36 is formed by the wheel house inner 34 and the wheel house outer 33, and an outside portion of the rear wheel house 32 is formed by a rear-fender reinforcement 38 which extends between a rear-quarter panel inner 37 and the wheel house outer 33 and a rear fender 39 which is located on the outside of the member 38.

Moreover, as shown in FIG. 3, a suspension housing 40 which supports a damper SD of a rear suspension mechanism is formed on the outside of the rear side frame 30. A suspension housing gusset 41 which has an arc shape in the plan view is joined to a skirt portion of the suspension housing 40 so as to surround the skirt portion. The suspension housing gusset 41 extends upward and be joined to the wheel house inner 34.

Figure 4:
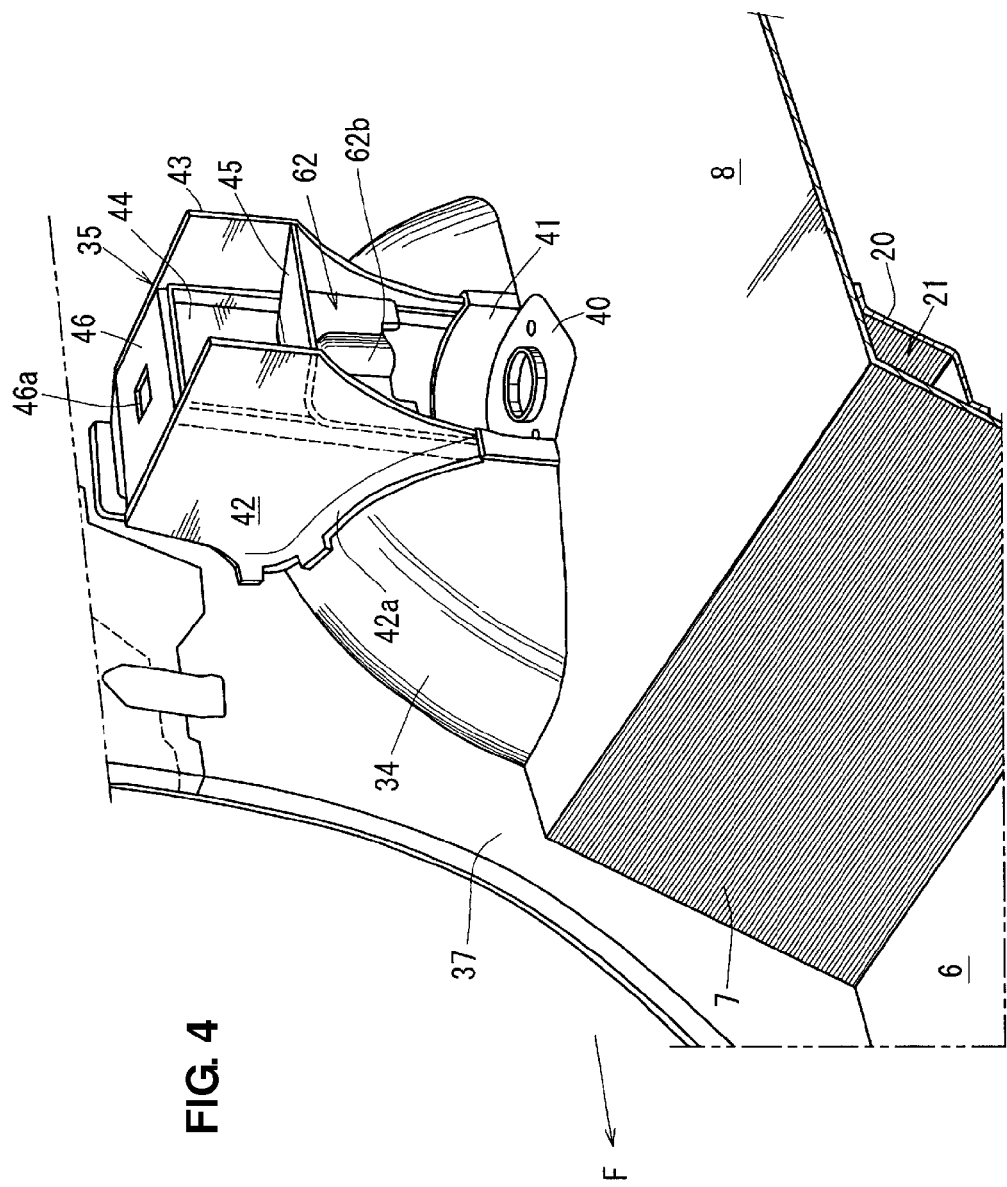
FIG. 4 is a perspective view showing surrounding structure of a rear wheel house and a wheel-house reinforcement on a vehicle right side.

The suspension housing gusset 41 is, as shown in FIG. 4, joined to a pair of package junctions 42, 43 which are away from each other longitudinally. Between the package junctions 42, 43 is disposed a suspension-housing reinforcement 44 which extends vertically, which is joined to the front and rear package junctions 42, 43.

These members form a suspension support structure. The front and rear package junctions 42, 43 have joint flanges 42a at their lower edges, and are joined to an inner face of the wheel house inner 34 and an inner face of a rear-quarter panel inner 37 as a vehicle-body side wall. The above-described suspension-housing reinforcement 44 which is disposed between the package junctions 42, 43 is joined to these members 42, 43.

As shown in FIG. 4, between the package junctions 42, 43 is disposed a junction lower member 45 at the middle position in the vertical direction, which is joined to the rear bulkhead 13.

As shown in FIG. 3, a junction upper member 46 which is located between the package junctions 42, 43 is arranged at the upper edge of the suspension-housing reinforcement 44. The junction upper member 46 is joined to the suspension-housing reinforcement 44, the package junctions 42, 43, and the rear-quarter panel inner 37, respectively. The junction upper member 46 has an opening 46a, and a shoulder belt (not illustrated) is pulled out of a belt retractor (not illustrated) through this opening 46a.

Further, the suspension-housing reinforcement 44, which is located on the inside of the wheel house inner 34 and the rear-quarter panel inner 37 which form the vehicle-body side wall, is joined to the wheel house inner 34 at its lower end. The upper end of the reinforcement 44 extends horizontally and is joined to an inner portion of the junction upper member 46. An outside end portion of the junction upper member 46 is joined to the rear-quarter panel inner 37. A closed cross section 47 is formed among the members 46, 37, 34, 44.

The above-described package junctions 42, 43, suspension-housing reinforcement 44, junction lower member 45, and junction upper member 46 form the above-described wheel-house reinforcement 35 which reinforces the rear wheel house 32.

As shown in FIG. 3, the bend portion 13b of the rear bulkhead 13 is fixed to the junction upper member 46 which forms the wheel-house reinforcement 35. Moreover, an anchor reinforcement 48 is attached vertically to the U-shaped portion 13c of the rear bulkhead 13.

Meanwhile, the damper SD of the rear wheel 36 constitutes the rear suspension mechanism. Herein, a multi link type of suspension including upper arms, lower arms, knuckle and so on may be applied as the rear suspension mechanism including the damper SD.

The damper SD comprises, as shown in FIG. 3, a cylindrical damper support 49, an upper spring sheet 50 which is fixed to its lower end, and a lower spring sheet 51 which is positioned below. A coil spring 52 is arranged between the upper and lower sheets 50, 51.

To the suspension-housing reinforcement 44 are attached a first gusset 61, a second gusset 62, and a third gusset 63 which support the damper support 49 which projects upward from the suspension housing 40.

Figure 5:
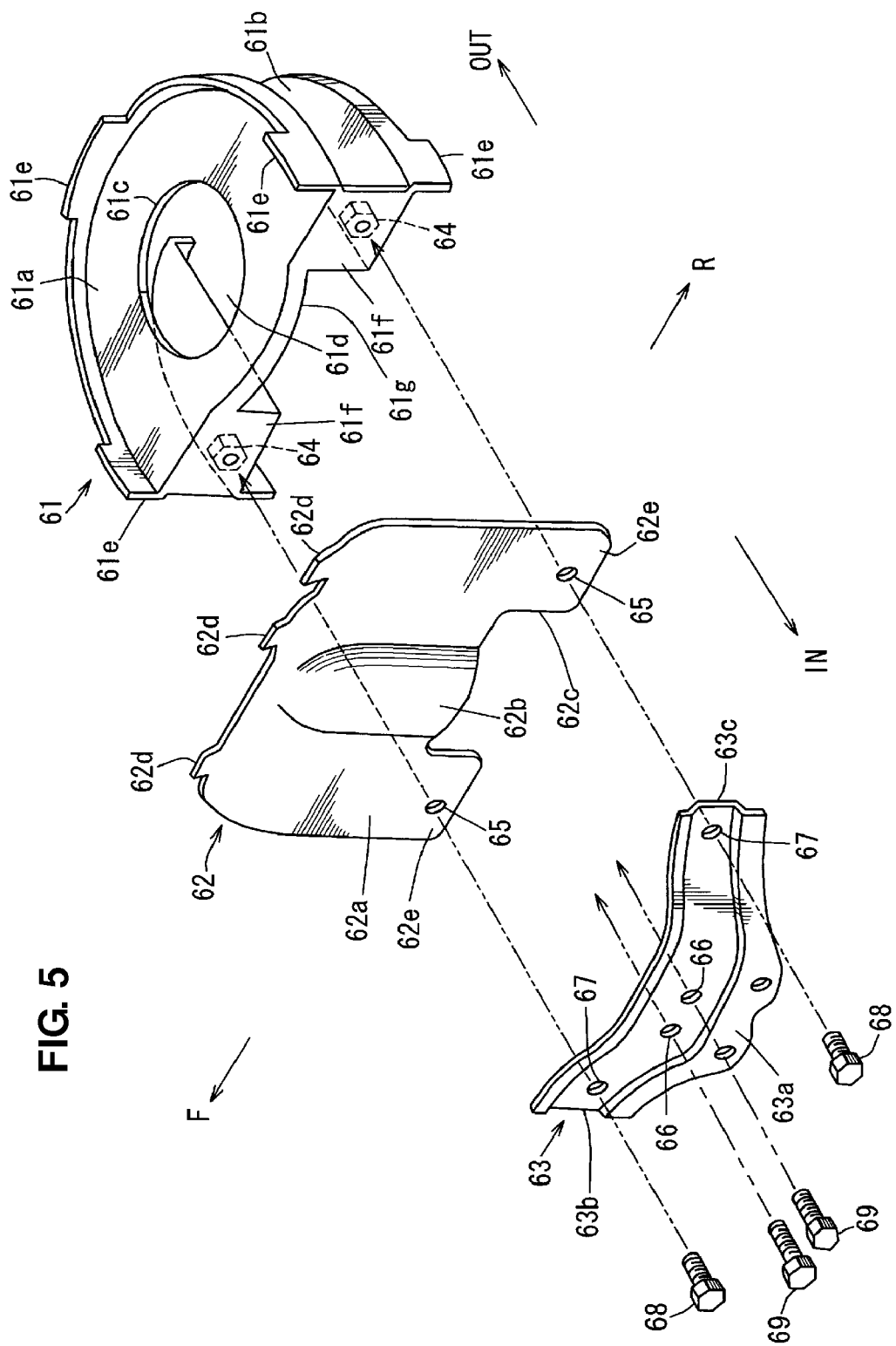
FIG. 5 is an exploded perspective view of each gusset.

The structure of the gussets 61, 62, 63 will be described referring to FIG. 5. As shown in FIG. 5, the first gusset 61 is a member which has a U-shaped cross section and includes upper and lower horizontal plate-shaped portions 61a, 61b. These plate-shaped portions 61a, 61b have holes 61c, 61d at their center for allowing the damper support 49 to extend through these holes. Further, plural flanges 61e are formed at the plate-shaped portions 61a, 61b. The flanges 61e are joined to the suspension-housing reinforcement 44.

Attaching faces 61f, 61f are formed longitudinally at a portion of the first gusset 61 which corresponds to the roof-storage space 14. A recess portion 61g is formed between these attaching faces 61f, 61f, and nuts 64, 64 are welded to the back faces of the attaching faces 61f, 61f. The first gusset 61 is attached to the suspension-housing reinforcement 44 as shown in FIG. 3.

The second gusset 62, as shown in FIGS. 3 and 5, extends upward from the first gusset 61 and is joined to the rear bulkhead 13 and the rear deck member 24 via the junction lower member 45. This second gusset 62 which extends vertically comprises, as shown in FIG. 5, a gusset main plate 62a, a protruding portion 62b which is formed at a portion of the gusset main plate 62a which corresponds to the damper support 49 and protrudes toward the roof-storage space 14, a notch portion 62c which is formed below the protruding portion 62b, and flange portions 62d ... which are integrally formed with the upper edge of the gusset main plate 62a. The attaching faces 62e, 62e have bolt through holes 65, 65.

The third gusset 63, which is disposed on the side of the roof-storage space 14 of the second gusset 62, is formed in a substantially V shape as shown in FIG. 5. Its front portion 63b and rear portion 63c are located upward and outward relative to its middle portion 63a. The middle portion 63a of the third gusset 63 has a couple of bolt through holes 66, 66, and each of the front and rear portions 63b, 63c has a bolt hole 67.

As shown in FIG. 3, the first and second gussets 61, 62 are welded to the vehicle body in advance, and bolts 68, 68 are fasted with nuts 64, 64 after the damper SD is attached. Thereby, the third gusset 63 is fixed to the gussets 61, 62. Further, the third gusset 63 is fixed to a bracket 70 of the damper support 49 with bolts 69, 69. As shown in FIG. 3, the upper end of the damper SD which is coupled to the rear wheel 36 is supported at the upper portion of the rear wheel house 32. Thus, the above-described rollover protecting member 27 is disposed at a position which corresponds to a damper support portion 71 which comprises the first, second and third gussets 61, 62, 63 and the suspension-housing reinforcement 44.

FIG. 6 is a partial enlarged sectional view of FIG. 3. The rollover protecting member 27 has a hollow structure comprises a flange portion 27a and a taper corn portion 27b. Some nuts 53 are welded to the lower face of the junction upper member 46 and the lower face of the bend portion 13b of the rear bulkhead 13, and bolts 54 are fastened from above. Thus, the rollover protecting member 27 is attached to the rear deck portion 26.

Herein, the bolts 54 and nuts 53 may be arranged upside down. That is, weld bots may be attached to the junction upper member 46 and the rear bulkhead 13, and nuts are fastened to these bolts from the above, thereby attaching the rollover protecting member 27 to the rear deck portion 26.

Figure 15:
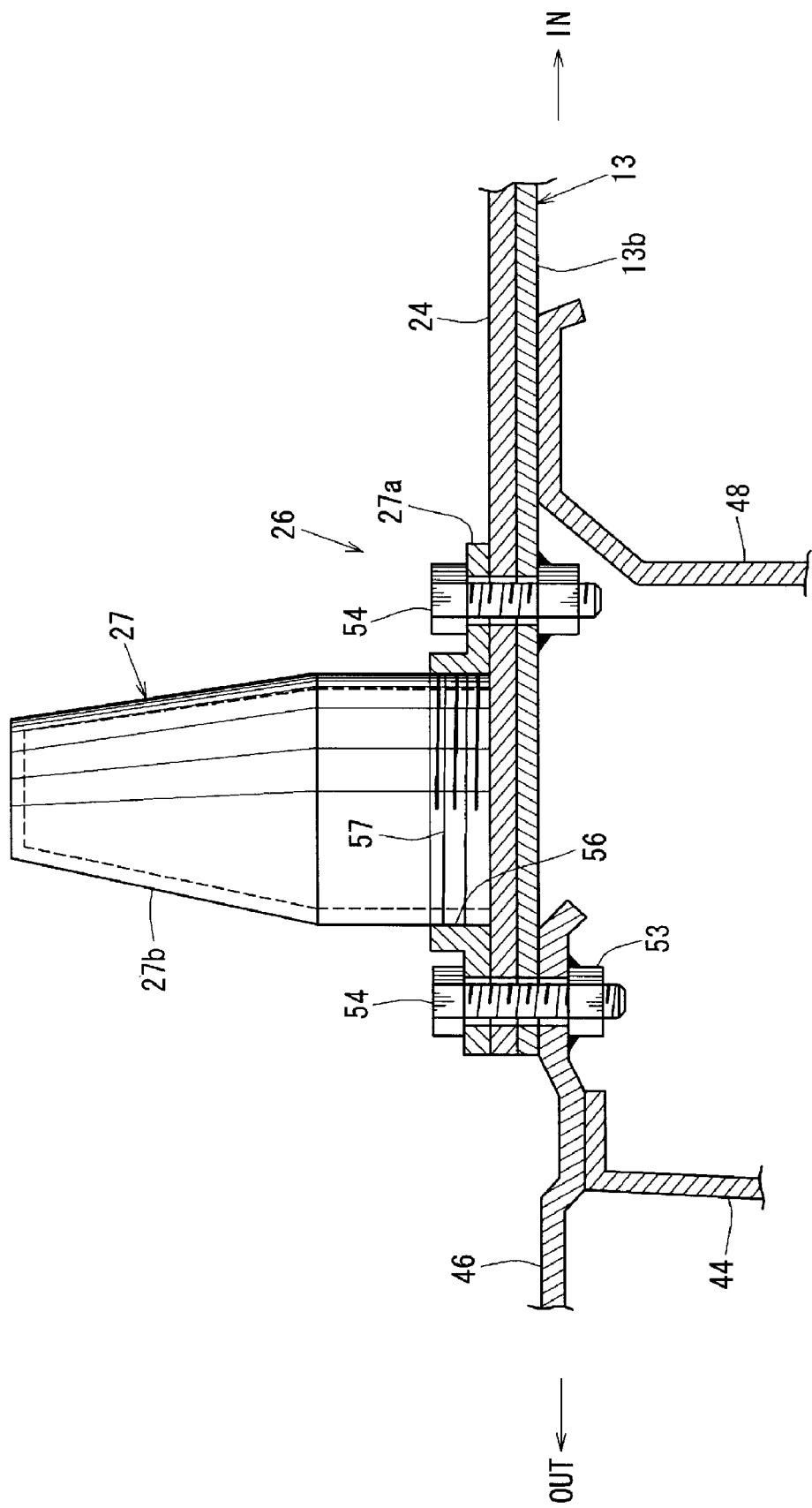
FIG. 15 is a plan view showing a disposition structure of a rollover protecting member according to a third embodiment.

Herein, a modified structure shown in FIG. 15 may be applied in place of the structure shown in FIG. 6. In this modification, the flange portion 27a and the taper corn portion 27b are formed separately. A thread hole 56 is formed at the inner periphery of the flange portion 27a, and a thread portion 57 is formed at a lower straight portion of the periphery of the taper corn portion 27b. The taper corn portion 27b is fixed to the flange portion 27a via engagement between the thread hole and portion 56, 57. Thereby, while the parts number may increase, the manufacturing of the rollover protecting member 27 can improve.

Figure 7:
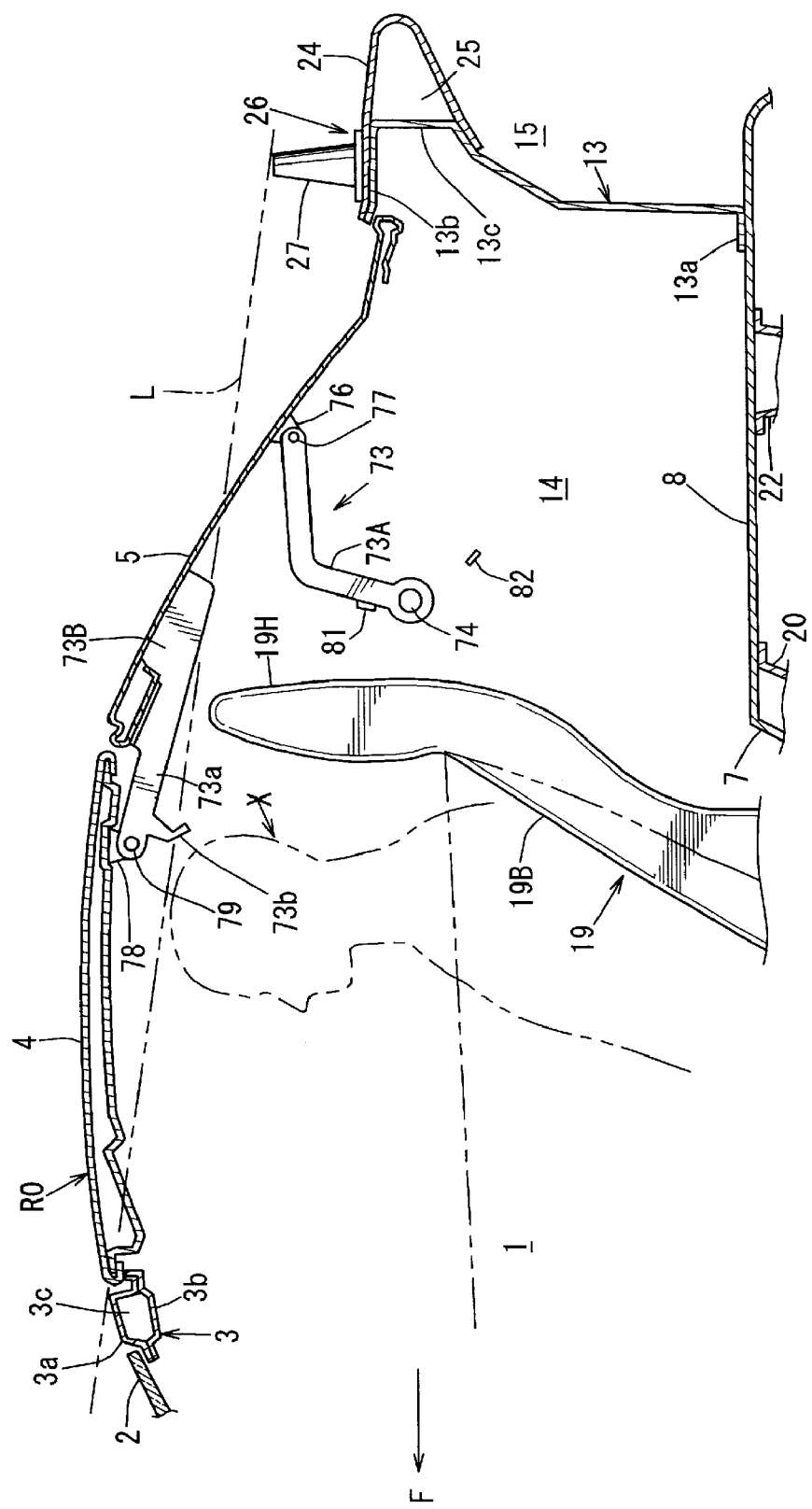
FIG. 7 is a side view in a roof-closed state.
Figure 8:
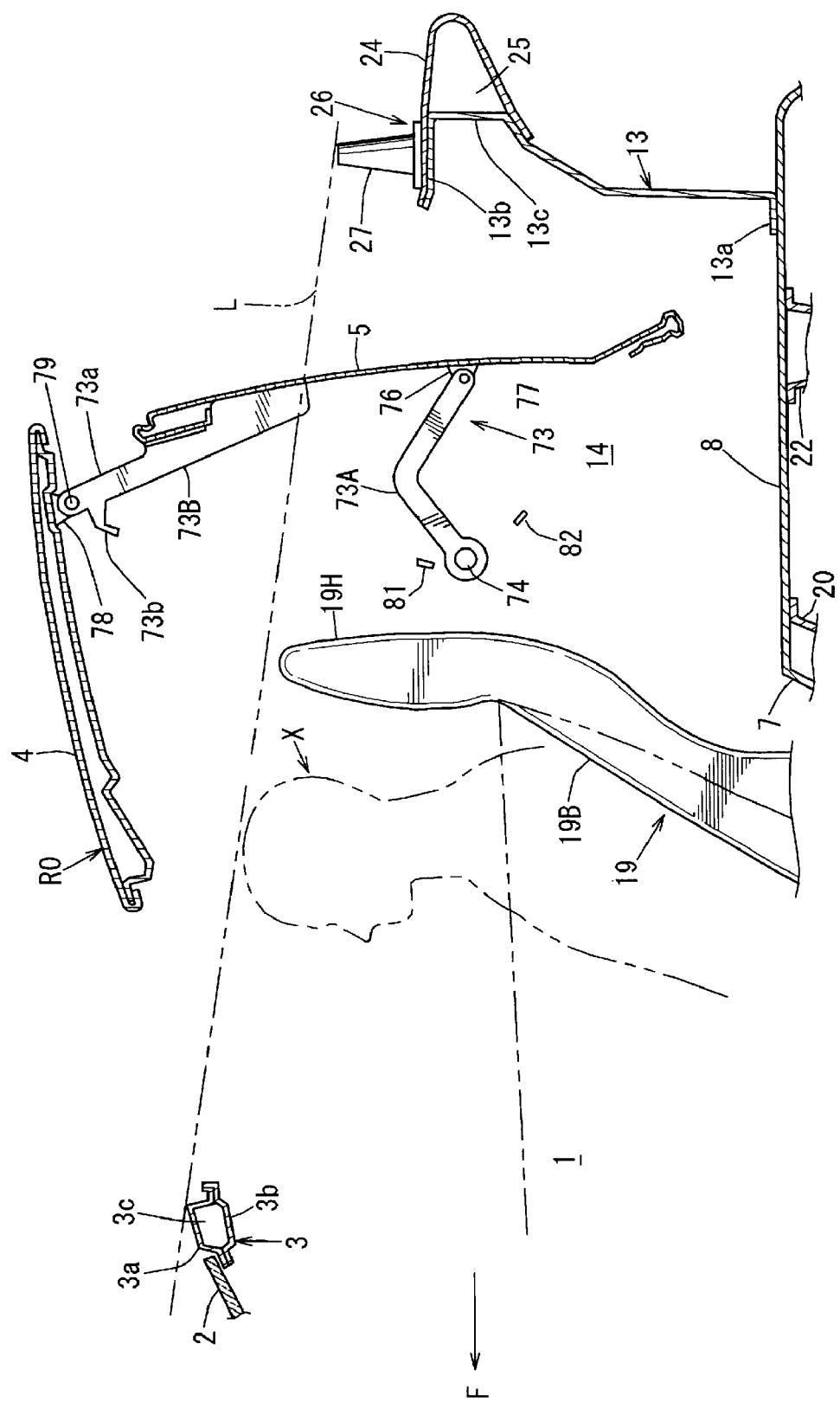
FIG. 8 is a side view in the middle state of roof opening.
Figure 9:
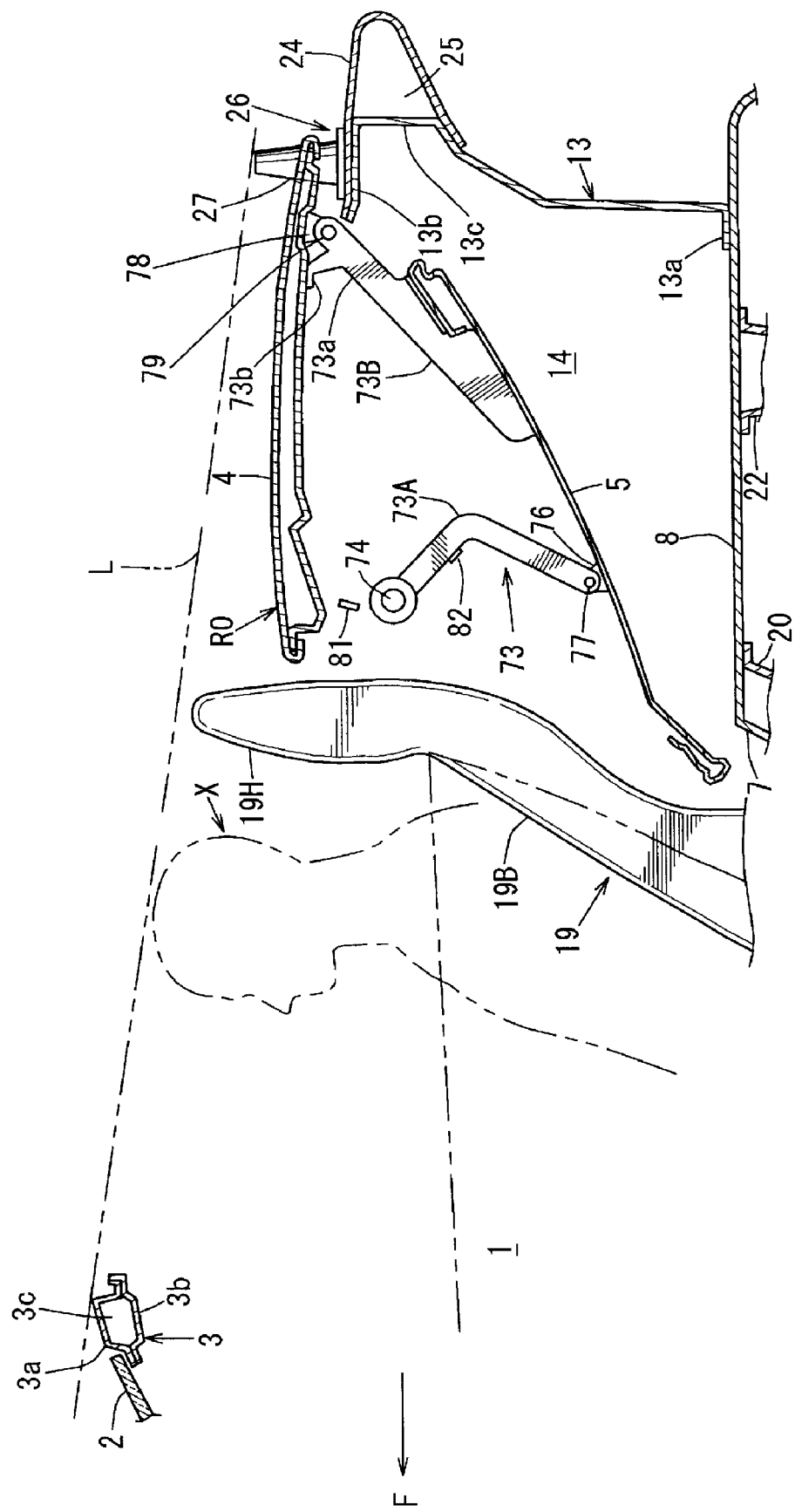
FIG. 9 is a side view in a roof-open state.
Figure 10:
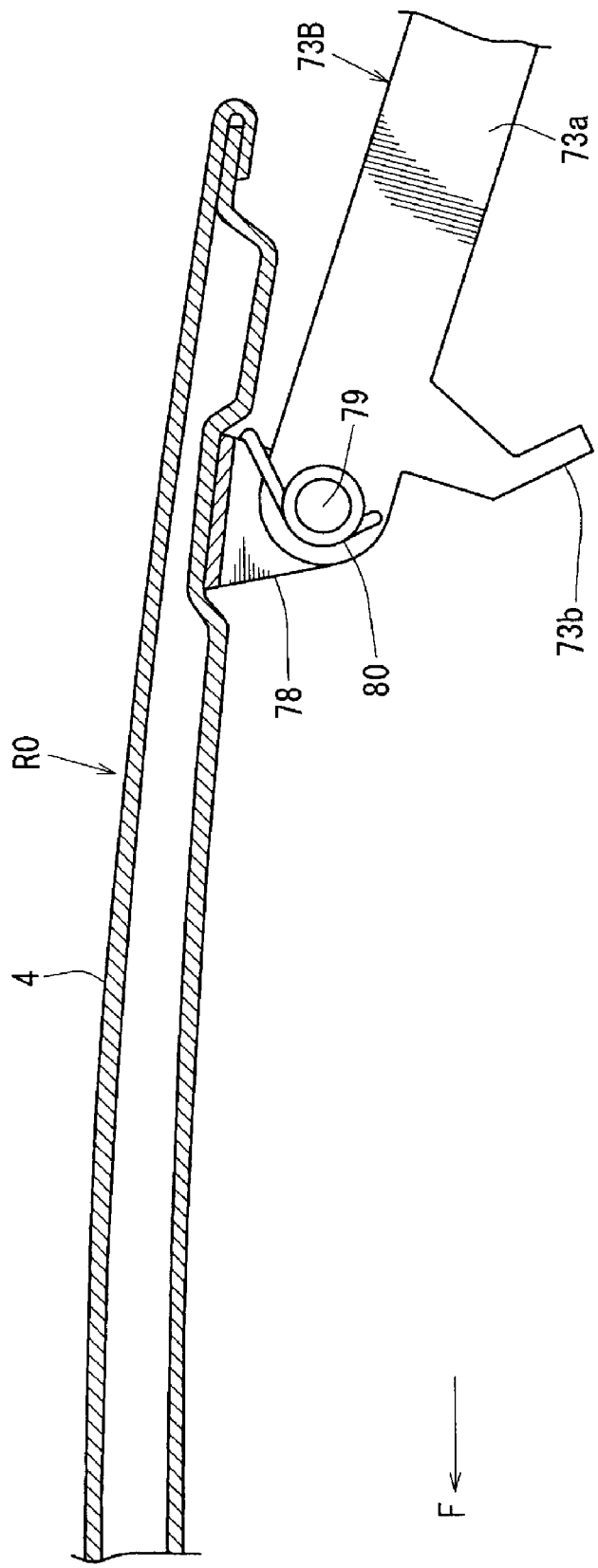
FIG. 10 is a partial enlarged sectional view of FIG. 7.
Figure 11:
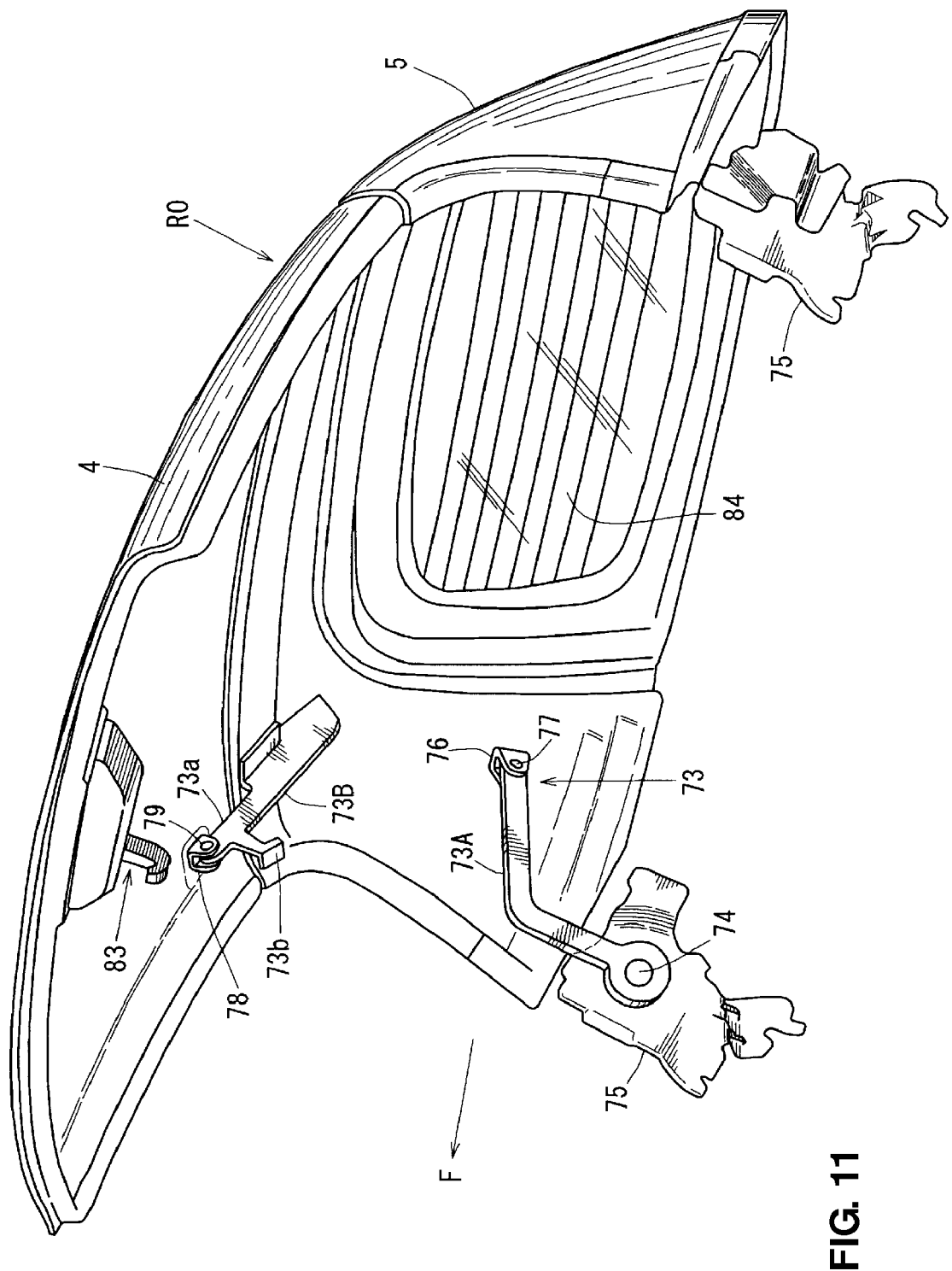
FIG. 11 is a schematic perspective view showing the roof opening structure for a vehicle.

Next, the roof opening structure for a vehicle will be described referring to FIGS. 7 through 11. FIG. 7 is a side view in a roof-closed state. FIG. 8 is a side view in the middle state of roof opening. FIG. 9 is a side view in a roof-open state. FIG. 10 is a partial enlarged sectional view of FIG. 7. FIG. 11 is a schematic perspective view showing the roof opening structure for a vehicle.

As shown in FIGS. 7 through 11, particularly FIG. 9, when the roof RO is opened and stored in the roof-storage space 14, there is provided a support mechanism 73 which substantially horizontally supports the roof RO which is stored in the roof-storage space 14 so that an upper space of the roof-storage space 14 between the seat 19 and the rear bulkhead 13 is covered with the front roof of the roof RO.

According to the present embodiment, as shown in FIGS. 7, 8 and 9, the roof RO is split into two parts, the front roof 4 and the rear roof 5. As shown in FIG. 9, the rear roof 5 is positioned inside the roof-storage space 14 and the front roof 4 is positioned above the rear roof 5 and covers over the roof-storage space 14.

Thus, the support mechanism 73 comprises a link 73A and another link 73B. As shown in FIG. 11, a base portion of the link 73A is rotatably supported at the rear-quarter panel inner 37 (see FIG. 4) via a support axis 74 and a bracket 75. The other end of the link 73A is coupled to a bracket 76 at the lower face of the rear roof 5 via a pin 77.

Meanwhile, the other link 73B is fixed to the front lower face of the rear roof 5. As shown in FIG. 7, this link 73B includes an extension portion 73a which extends from the rear roof 5 toward the front roof 4. One end of this extension portion 73a is coupled to a bracket 78 at the rear lower face of the front roof 4 via a pin 79.

As shown in FIG. 11, the support mechanism 73 which comprises the links 73A, 73B is provided at the both sides of the roof RO as shown in FIG. 11, but only the support mechanism 73 on the right side is illustrated.

Further, as shown in FIG. 10, a spring 80 is provided between the pin 79 at the end portion of the link 73B and the bracket 78 of the front roof 4 so that the front roof 4 is moved rearward, keeping its forward-slant position. Herein, the length of a front-side portion of the front roof 4 from the pin 79 in the roof-closed state shown in FIG. 7 is so greater than that of a rear-side portion of the front roof 4 from the pin 79 that the front-side portion of the front roof 4 is heavier than the rear-side portion of the front roof 4. Consequently, the front roof 4 tends to slat forward. For this reason, a spring force of the above-descried spring 80 may be set to be properly small.

The roof RO of the present embodiment is manually opened and closed. When the roof RO is opened as shown in FIG. 9 from the state of FIG. 7 by way of the state shown in FIG. 8, the link 3A rotates around the center of the support axis 74 and thereby the rear roof 5 is moved upside down and stored inside the roof-storage space 14. Meanwhile, the front roof 4 is moved rearward keeping its forward-slant position, and eventually positioned above the rear roof 5 and covers over the roof-storage space 14 substantially horizontally.

In FIG. 9, the extension portion 73a of the link 3B has a restriction piece 73b to support the front roof 4 from below and prevent the front roof 4 from inclining forward excessively for the purse of the excessive inclination of the front roof 4 due to the spring force of the coil spring 80 (see FIG. 10). Accordingly, after the front roof 4 is moved rearward keeping its forward-slant position as shown in FIG. 8, it can cover the storage space 14 substantially horizontally as shown in FIG. 9.

In FIGS. 7 through 9, stoppers 81, 82 are provided to restrict the upper limit and the lower limit. In particular, the stopper 82 can surely prevent the front and rear roofs 4, 5 and the links 73A, 73B which are in their storage positions from lowering further improperly. Further, in FIG. 11, a top block 83 is provided to detachably attach the roof RO to the front header 3, and reference numeral 84 denotes a back window. In figures, an arrow F shows a direction of vehicle front, an arrow R shows a direction of vehicle rear, an arrow IN shows an inward direction of vehicle, and an arrow OUT shows an outward direction of vehicle.

Hereinafter, the operation of the above-described embodiment will be described. When the roof RO in the closed state shown in FIG. 7 is opened as shown in FIG. 9, at first the top lock 83 (see FIG. 11) of the roof RO is unlocked, and then the front roof 4 is moved rearward by the manual operation. This rearward moving force is transmitted to the link 73B and the link 73A via the rear roof 5, so that the link 73A rotates around the support axis 74 clockwise, and the rear roof 5 moves to its rising position shown in FIG. 8 from its close position shown in FIG. 7. The front roof 4 which is supported by the link 73B is moved rearward, keeping its forward-slant position with the spring force of the spring 80 and the weight balance regarding the above-described pin 79, as shown in FIG. 8.

As the front roof 4 is further moved rearward from the middle state of roof opening shown in FIG. 8, this rearward moving force is transmitted to the link 73B and the link 73A via the rear roof 5. Accordingly, the link 73A further rotates around the support axis 74 clockwise, so that the rear roof 5 changes its position upside down from the state of FIG. 8 to the state shown in FIG. 9. The front roof 4 is moved above this rear roof 5 and covers over the roof-storage space 14 substantially horizontally.

Meanwhile, in case of the vehicle rollover, while the roof RO is in the open state shown in FIG. 9, the vehicle is supported by the front header 3 and the rollover protecting members 27 because the height of the rollover protecting member 27 is set so that the line L connecting the upper end of the rollover protecting member 27 and the upper end of the front header 3 can be positioned higher than the upper end of the headrest 19H of the seatback 19B. Accordingly, the passenger X can be protected surely by the rollover protecting member 27 at the vehicle rollover.

Further, since the rollover protecting members 27 are arranged at the positions which correspond to the rear deck members 24 and the rear wheel houses 32, the sufficient rigidity of the rollover protecting members 27 can be ensured. In particular, this ensuring of the sufficient rigidity of the rollover protecting members 27 can be achieved with the exiting vehicle-body structure. Accordingly, both the compactness and the light weight of the passenger protecting structure can be provided.

As described above, according to the roof opening structure of the open car according to the present embodiment shown in FIGS. 1 through 11, there are provided the front header 3 which extends in the vehicle width direction in front of the passenger's seat 19 which is arranged in the vehicle compartment 1 and supports the upper side of the windshield 2, the roof RO which extends rearward from the front header 3 and forms the upper portion of the vehicle compartment 1, the roof RO being split into plural parts and openable, the roof-storage space 14 which is formed between the passenger's seat 19 and the rear bulkhead 13 which forms the rear end of the vehicle compartment 1, in which the roof RO is stored when the roof RO is open, and the support mechanism 73 which substantially horizontally supports the roof RO which is stored in the roof-storage space 14 so that the upper space of the roof-storage space 14 between the passenger's seat 19 and the bulkhead 13 is covered with only one (see the front roof 4) of the plural parts of the roof RO (see FIGS. 7 and 9).

According to the present embodiment, since the upper space of the roof-storage space 14 between the passenger's seat 19 and the bulkhead 13 is covered with only one (see the front roof 4) of the split parts of the roof RO when the roof RO is open and stored in the roof-storage space 14, the properly simple and light structure of the roof RO without any conventional deck cover can be provided. Further, the upper of the roof-storage space 14 is covered only with this one (see the front roof 4) of the split parts of the roof RO, so the appearance can be improved.

Further, the roof RO comprises the front roof 4 and the rear roof 5 which are split from each other, and the rear roof 5 is positioned inside the roof-storage space 14 and the front roof 4 is positioned above the rear roof 5 and covers over the roof-storage space 14 (see FIG. 9). Thereby, since the roof RO is split into the front roof 4 and the rear roof 5, the roof structure can be made simple. Further, since the rear roof RO is stored inside the roof-storage space 14 and the roof-storage space is covered with the front roof 4, specifically, the front roof 4 covers the space between the seat 19 and the rear bulkhead 13 substantially horizontally, the good appearance can be provided.

Moreover, the roof RO is configured so that the rear roof 5 is moved upside down and stored inside the vehicle compartment 1 and the front roof 4 is moved rearward and above the rear roof 5, keeping its position thereof, and covers over the roof-storage space 14 (see FIGS. 7 and 9).

Herein, the upside down move of the rear roof 5 means that the rear roof 5 turns so that the lower face of the rear roof 5 faces upward, while the upper face of the rear roof 5 faces downward, so that the position of the rear roof 5 changes from its rearward-slant position in the roof-closed state to the forward-slant position. Thereby, since the rear roof 5 is moved upside down and stored inside the vehicle compartment 1, the support mechanism 73 can be made simple and the roof-storage space 14 can be made compact.

Further, the front roof 4 is supported by the supporting mechanism 73 so as to be moved rearward, keeping its forward-slant position (see FIGS. 7, 8 and 9). Thereby, since the front roof 4 can be kept in the forward-slant position during its rearward move, the front roof 4 may not receive traveling winds improperly. Consequently, the roof RO can be properly operated even during the vehicle's traveling at a low speed, thereby improving the facility.

In addition, the rollover protecting members 27 are arranged at the rear deck portion 26, and the height of the rollover protecting member 27 is set so that the line L connecting the upper end of the rollover protecting member 27 and the upper end of the front header 3 can be positioned so as to protect the passenger X (see FIG. 7). Thereby, the vertical length of the rollover protecting member 27 can be properly short to aim at the small size, so that the light weight of the rollover protecting member 27 can be achieved.

Further, in case of the vehicle rollover in the open state of the roof RO, the vehicle can be supported by the front header 3 and the rollover protecting members 27, thereby ensuring the safety of the passenger. Moreover, since the rollover protecting members 27 are arranged at the rear deck portion 26, the vehicle compartment 1 can be made spacious and also the rollover protecting members 27 can be properly provided. As a result, the vehicle compartment 1 can be used widely and the passenger can be protected properly with the rollover protecting members 27.

In addition, the vertical length of the rollover protecting member 27 is properly short, so the appearance can be improved from the design aspect and the better rear view can be ensured. Further, the height of the rollover protecting member 27 is set so that the line L connecting the upper end of the rollover protecting member 27 and the upper end of the front header 3 can be positioned above the upper end of the passenger's seat 19 (see FIG. 7).

The passenger's seat 19 is set so as to correspond to the size of the passenger, so the passenger can be protected surely at the vehicle rollover by setting the height of the rollover protecting member 27.

Embodiment 2

Figure 12:
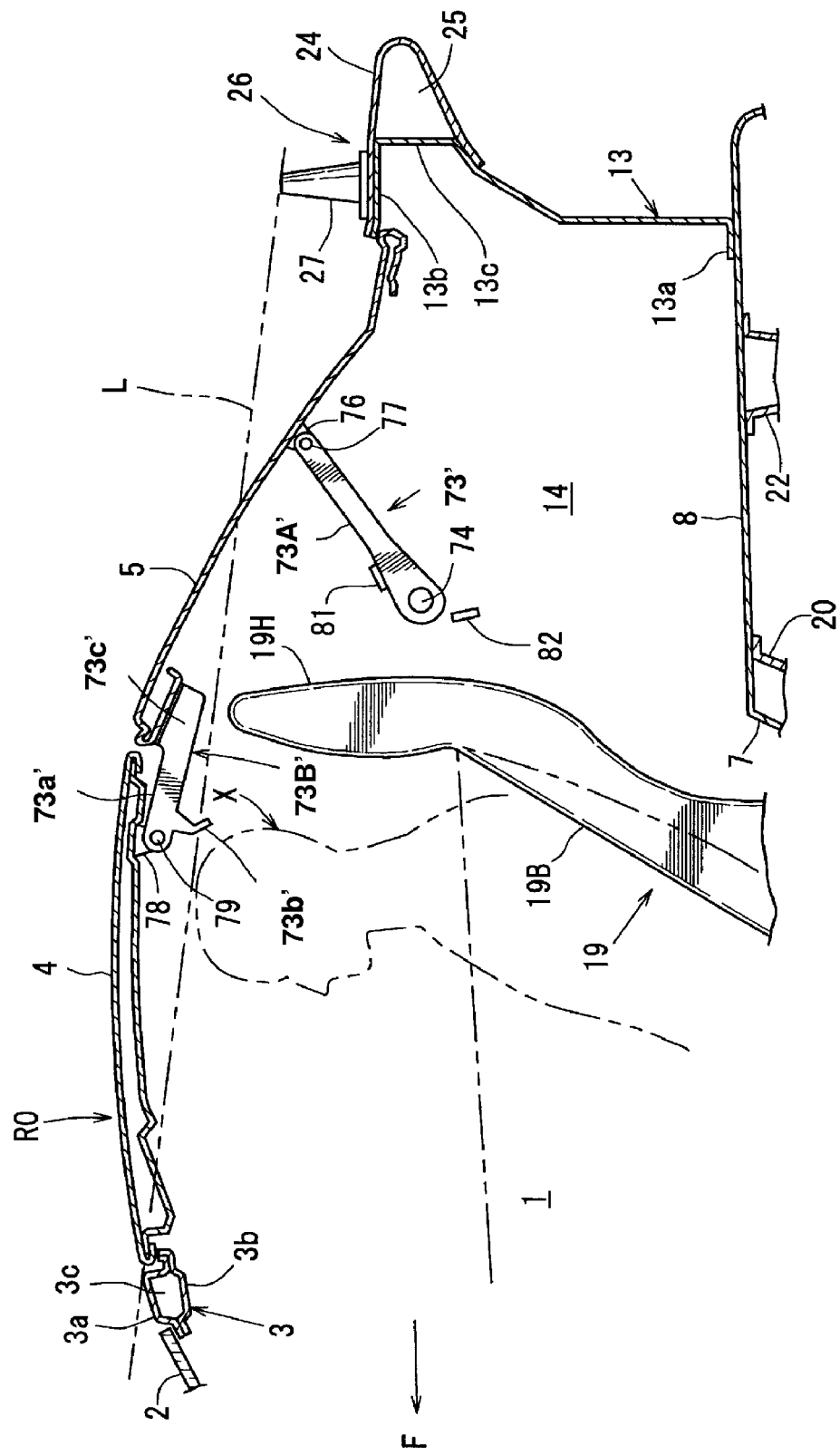
FIG. 12 is a side view of the roof opening structure for a vehicle in the roof-closed state according to a second embodiment.
Figure 13:
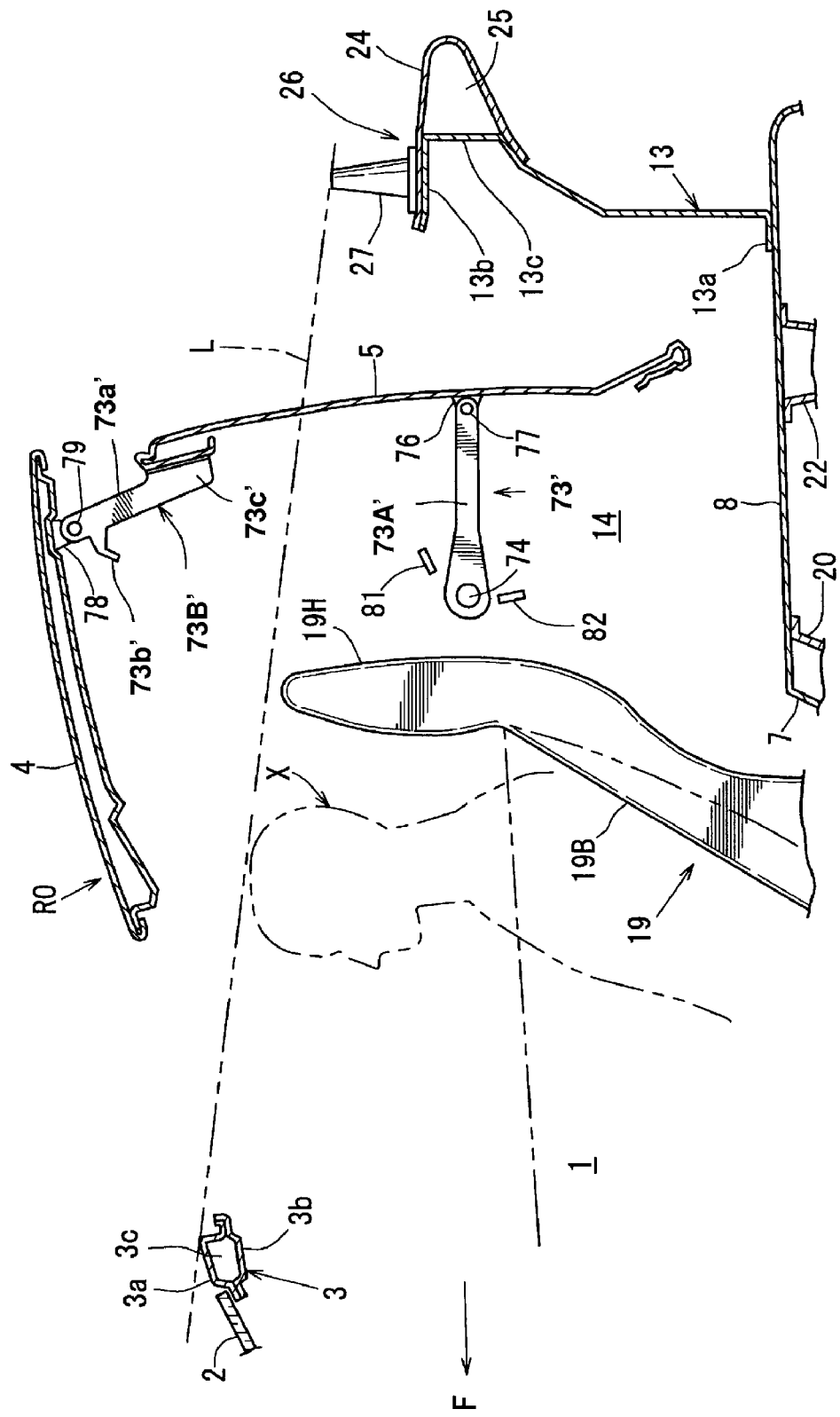
FIG. 13 is a side view in the middle state of roof opening.
Figure 14:
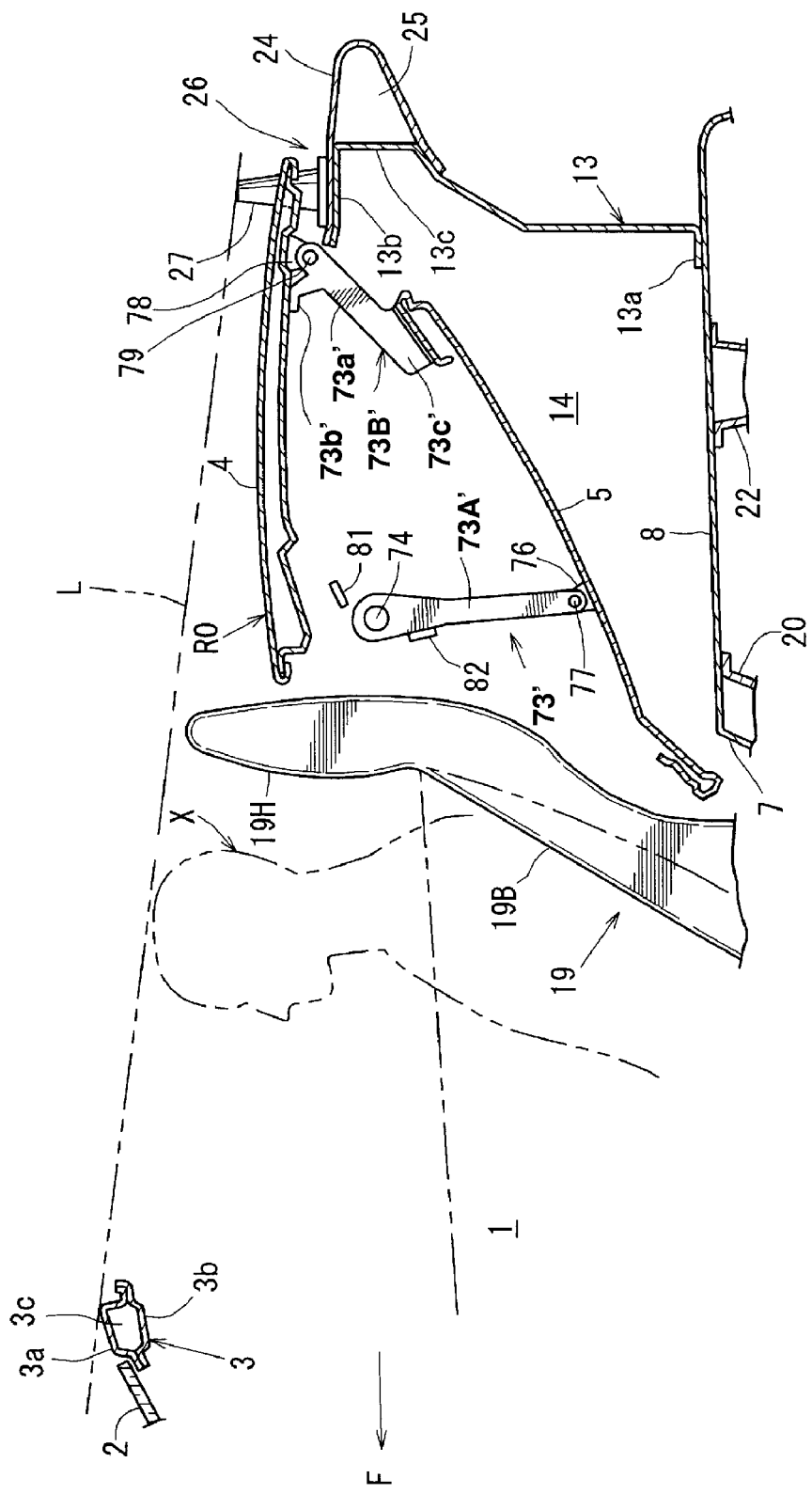
FIG. 14 is a side view in the roof-open state.

A second embodiment is shown in FIGS. 12-14. FIG. 12 is a side view in the roof-closed state, FIG. 13 is a side view in the middle state of opening of the roof RO, and FIG. 14 is a side view in the roof-open state.

While the L-shaped link in the side view is used as the link 73A of the support mechanism 73 in the embodiment shown in FIGS. 1-11, the present embodiment shown in FIGS. 12-14 uses a straight-line shaped link as a link 73A' of a support mechanism 73'.

Further, a short link having an extension portion 73a', a restriction portion 73b', and an attaching portion 73c' is used as a link 73B' in the present embodiment. Thereby, the light weight and cost reduction of the links 73A', 73B' can be achieved. The other structures, operations and advantages of the present embodiment shown in FIGS. 12-14 are substantially the same as those of the above-described embodiment. Accordingly, the same components/structures of FIGS. 12-14 as those of the above-descried embodiment are denoted by the same reference characters, detailed descriptions of which are omitted.

Embodiment 3

Figure 16:
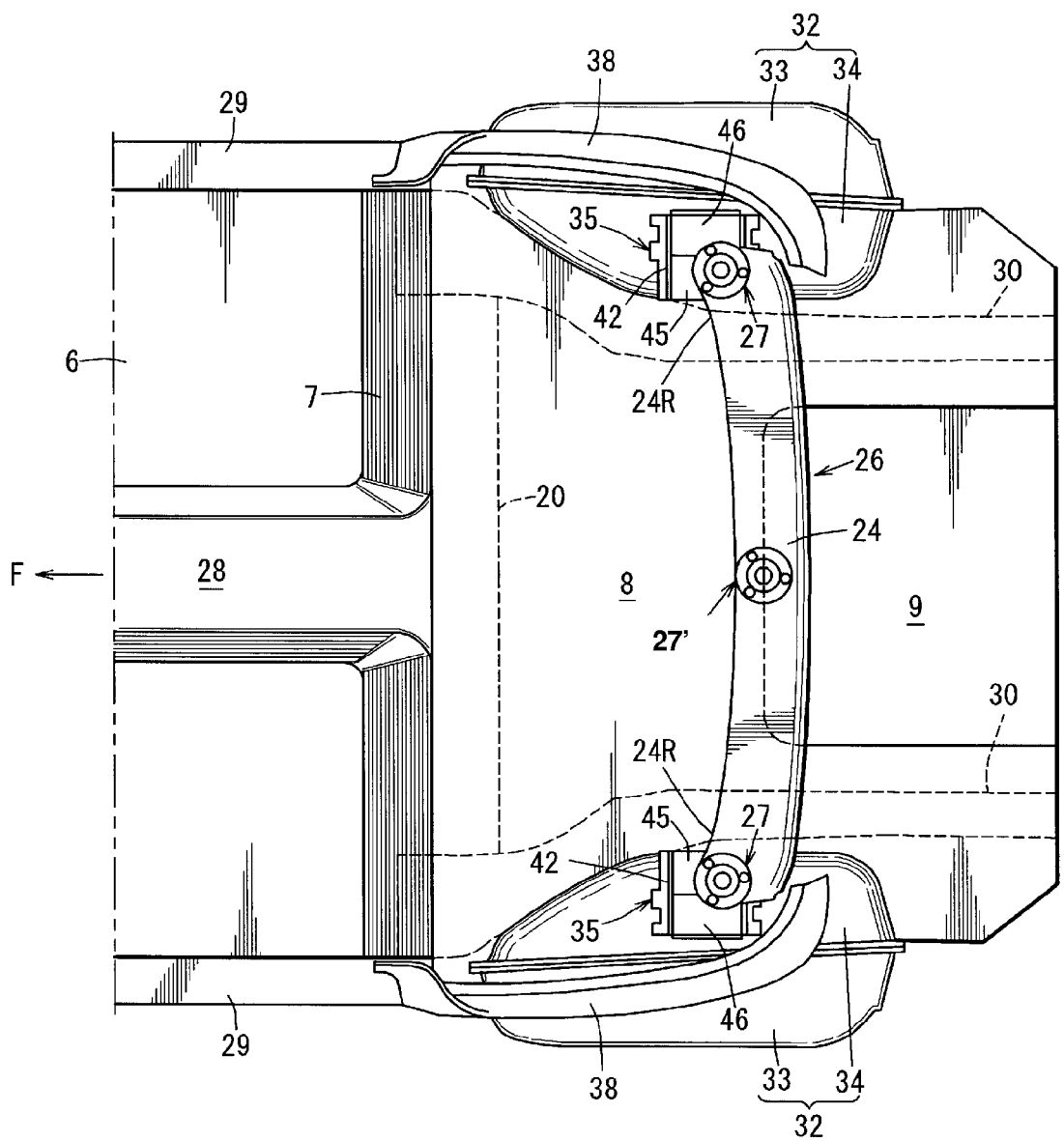
FIG. 16 is a plan view of a passenger protecting structure for a vehicle according to a fourth embodiment.

A third embodiment shown in FIG. 16 may be applied in place of the above-described embodiment shown in FIG. 2. According to the present embodiment, a rollover protecting member 27' is further provided at a central portion of the rear deck portion 26 in the vehicle width direction, in addition to the rollover protecting members 27 at the both sides which are shown in FIG. 2.

That is, the rollover protecting member comprises plural members 27, 27'which are away from each other in the vehicle width direction, in total three members in the present embodiment. Thereby, the passenger can be surely protected by the plural rollover protecting members 27, 27' even in case the vehicle rolls over in various manners as well, like the above-described embodiments 1 and 2.

Embodiment 4

Figure 17:
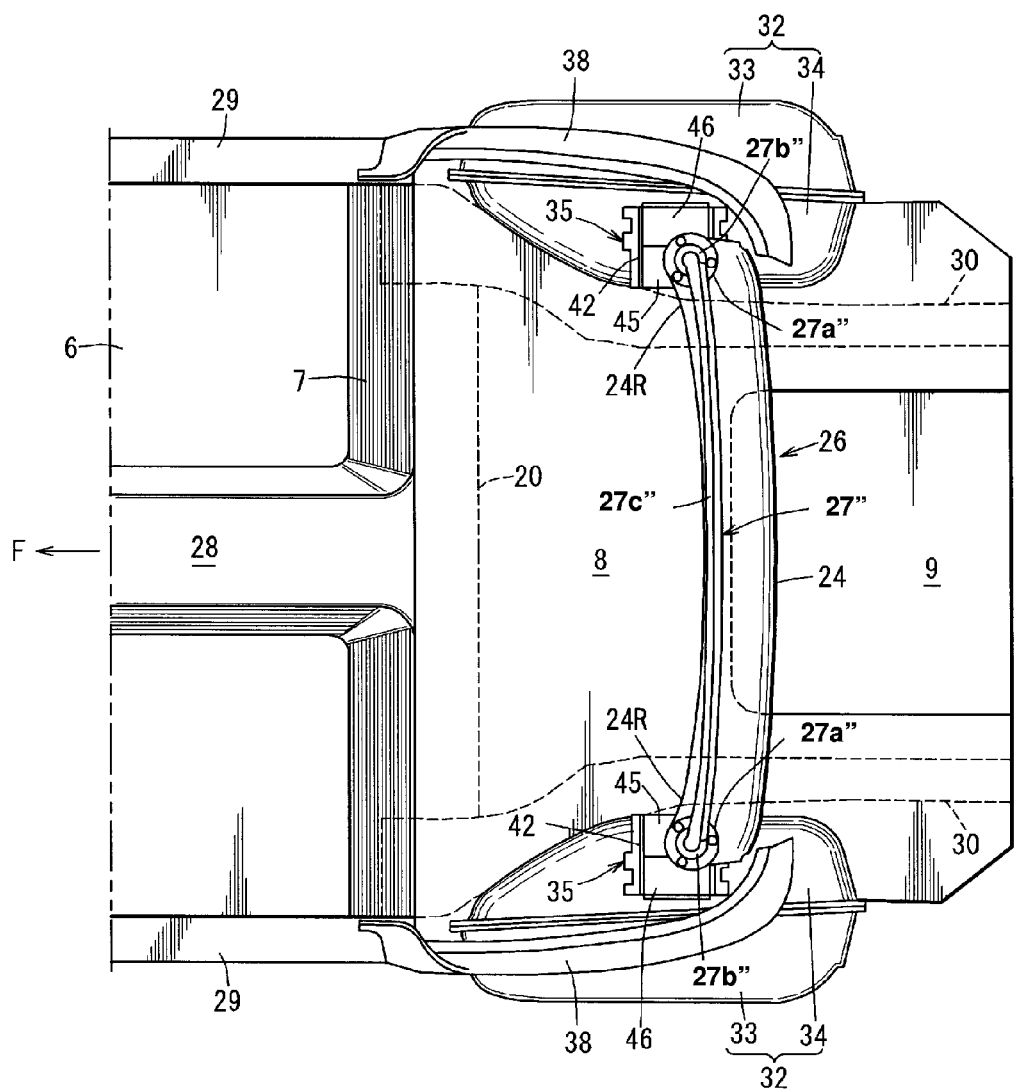
FIG. 17 is a perspective view of a rollover protecting member shown in FIG. 8.
Figure 18:
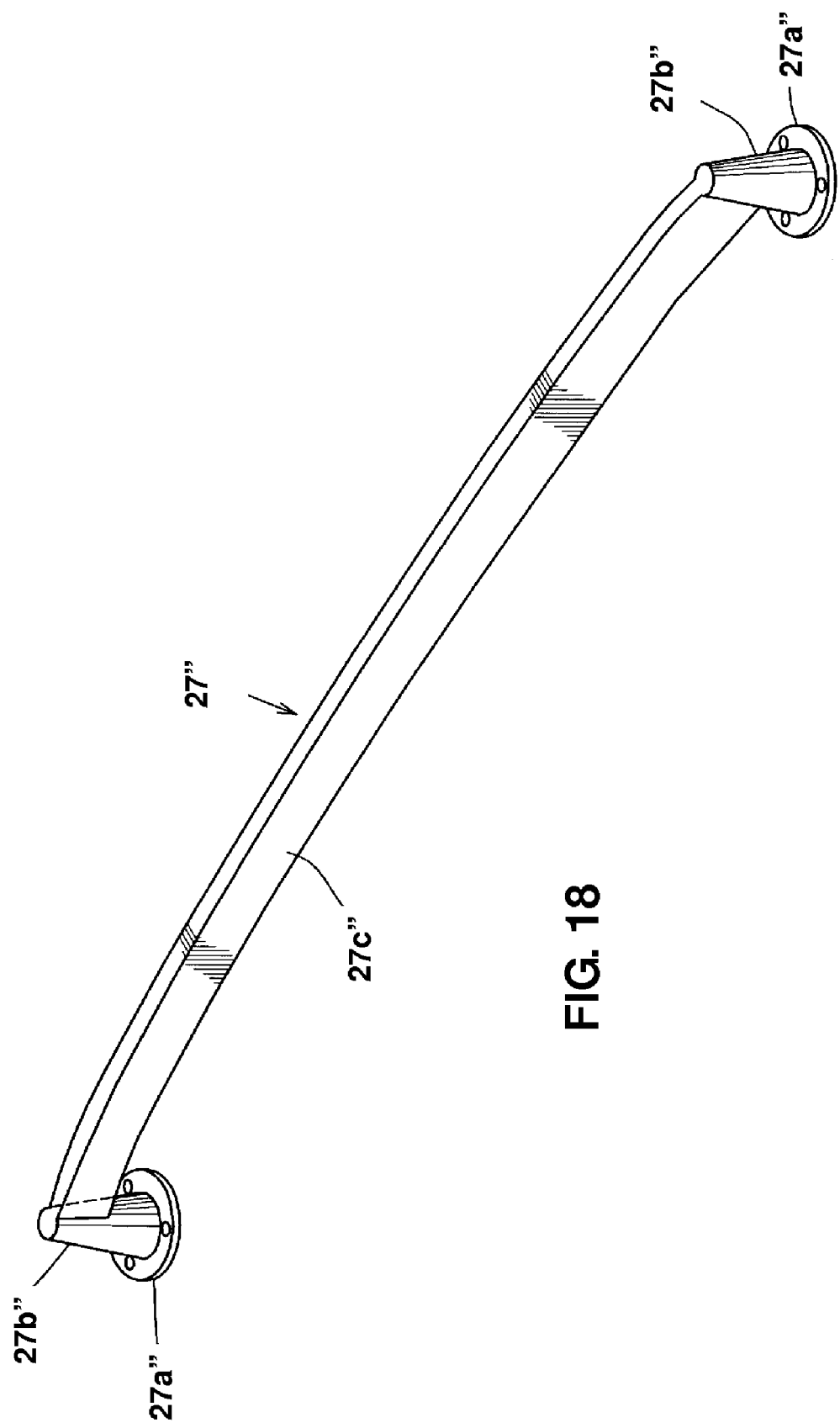
FIG. 18 is a sectional view of a modification of the disposition structure of a rollover protecting member.

A fourth embodiment shown in FIGS. 17 and 18 may be also applied alternatively. In the present embodiment, there is provided a rollover protecting member 27" which comprises a pair of disc portions 27a", 27a" and taper corn portions 27b", 27b" which is provided at the rear deck member 24 at the both sides, and a connecting member 27c" which interconnects the both-side taper corn portions 27b", 27b".

That is, the rollover protecting member 27" comprises the member 27c" which extends in the vehicle width direction. Thereby, the passenger X can be surely protected by the rollover protecting member 27" which extends in the vehicle width direction even in case the vehicle rolls over in various manners, and the rigidity of the vehicle body can be increased properly by this protecting member.

Embodiment 5

A fifth embodiment of the present invention will be described referring to FIGS. 19 through 24.

Figure 19:
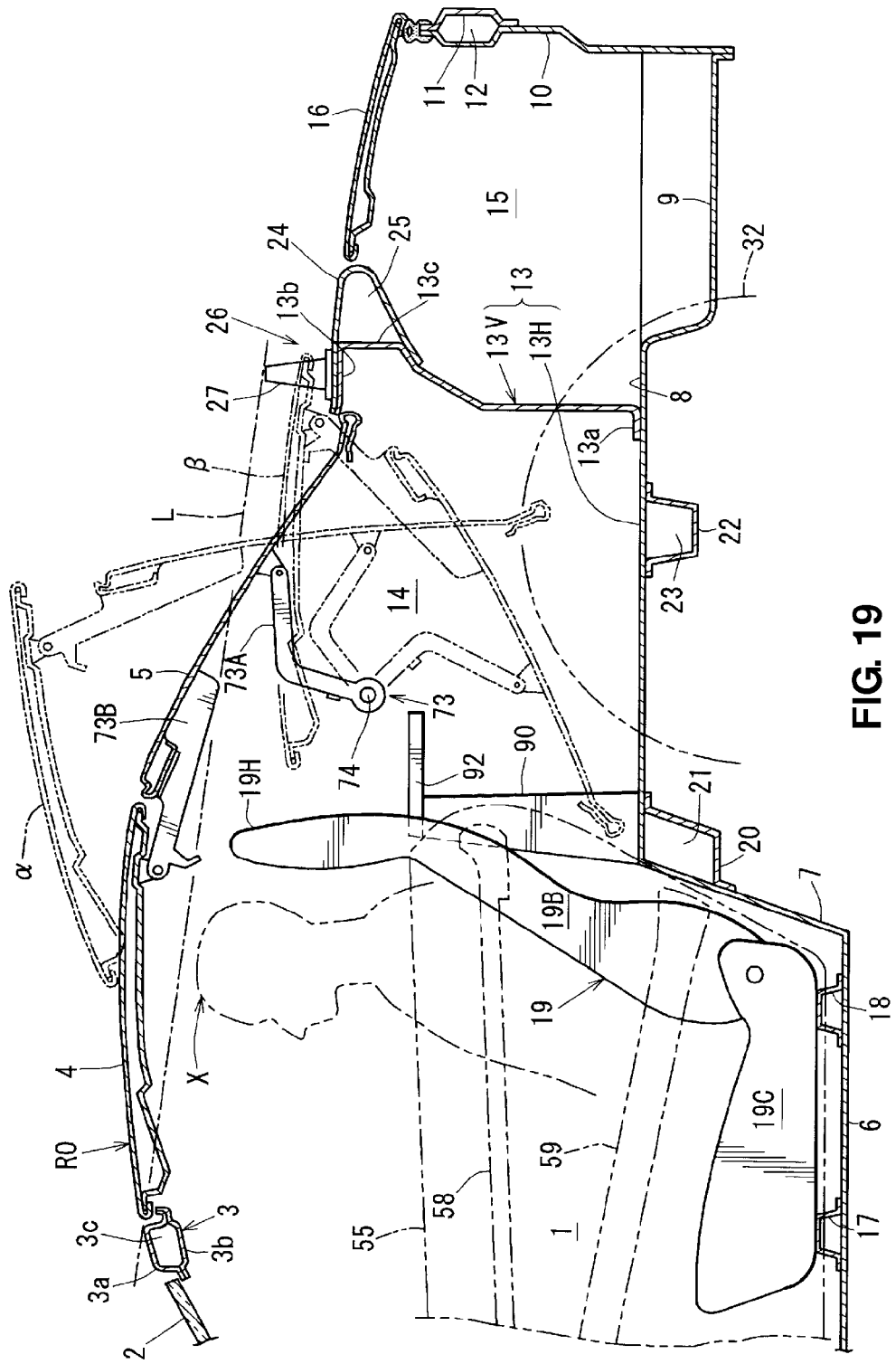
FIG. 19 is a side view showing a vehicle-body rear structure for a vehicle according to a fifth embodiment of the present invention.
Figure 20:
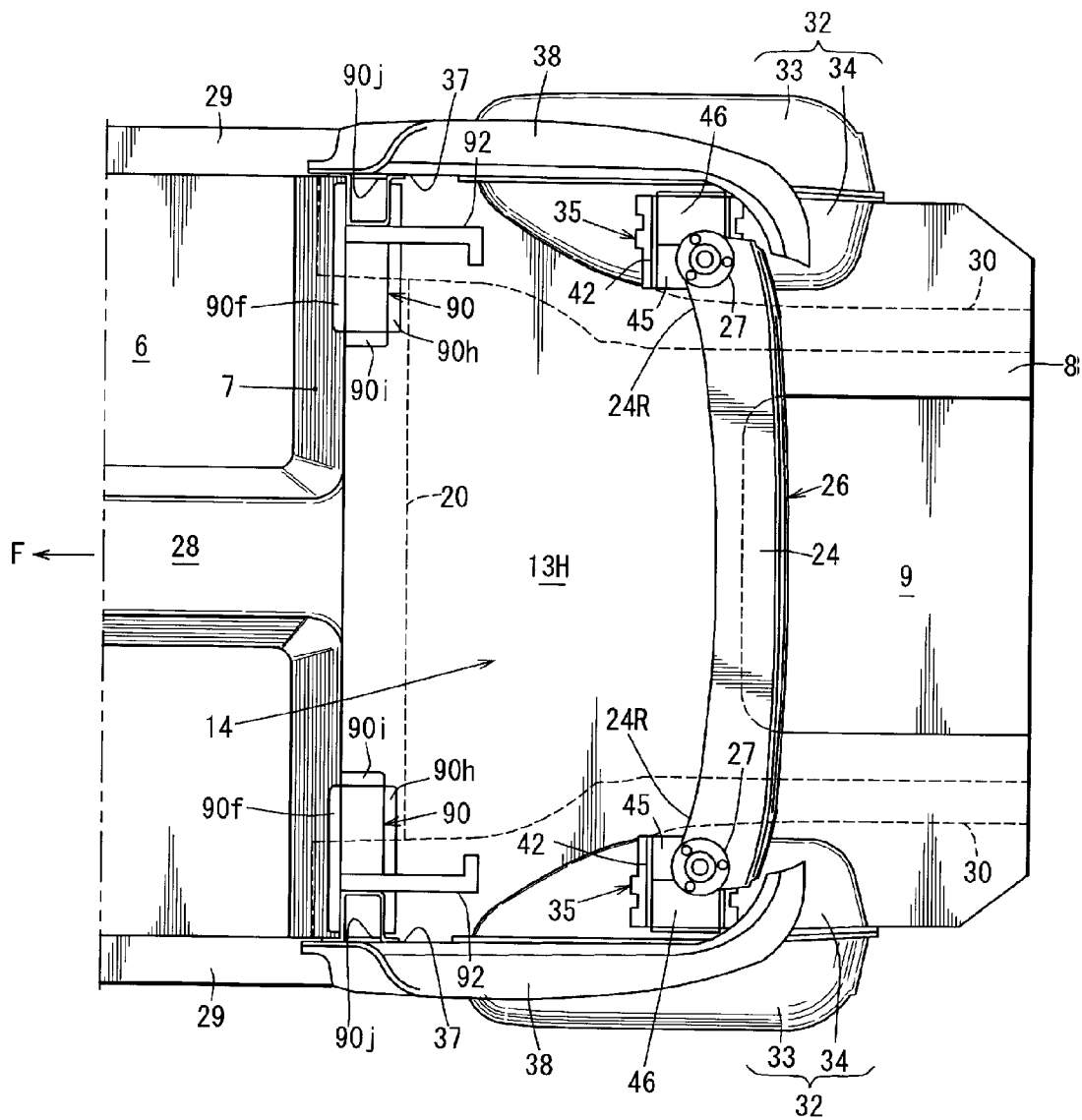
FIG. 20 is a plan view of a major portion of FIG. 19.
Figure 22:
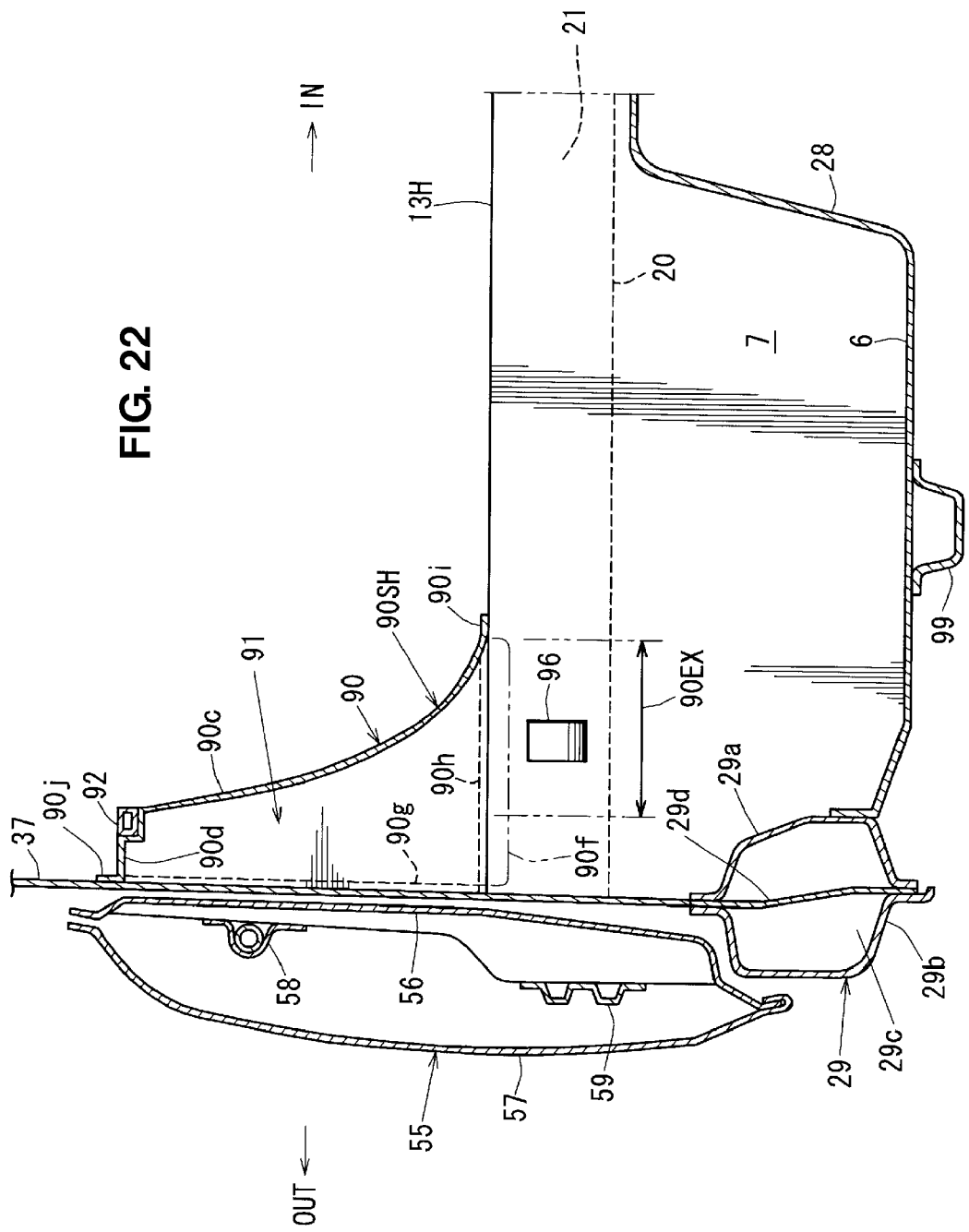
FIG. 22 is an elevation view showing a disposition structure of a rear side gusset.

As shown in FIGS. 19 and 22, a door 55 is provided at the side of the vehicle compartment 1 to be openable. This door 55 comprises a door inner panel 56 and a door outer panel 57 which are joined to each other as shown in FIG. 22. Inside the door 55 are attached door impact bars 58, 59 which extend in the longitudinal direction of the vehicle as shown in FIGS. 19 and 22.

Figure 23:
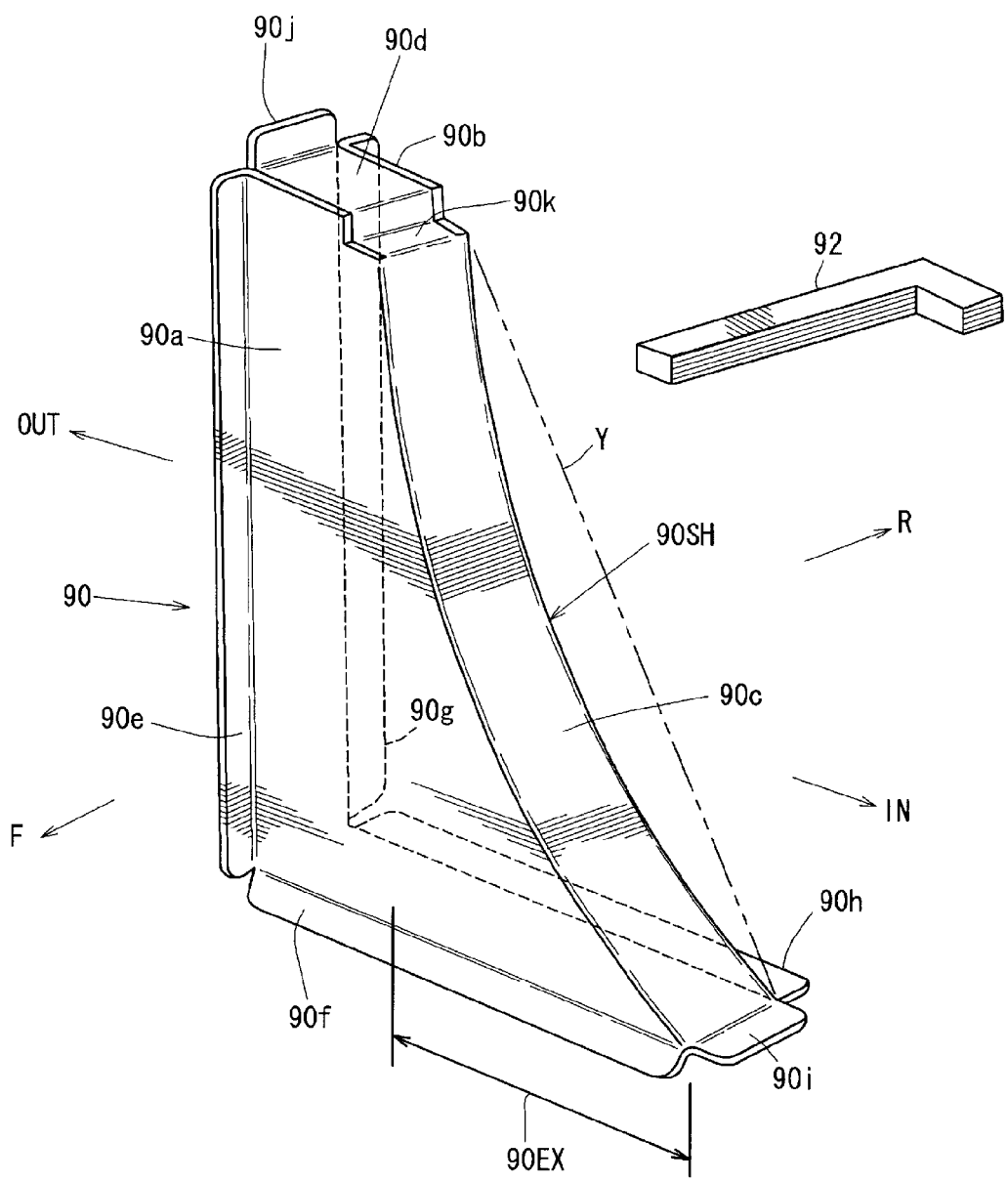
FIG. 23 is an exploded perspective view of the rear side gusset and a shoulder anchor bracket.
Figure 24:
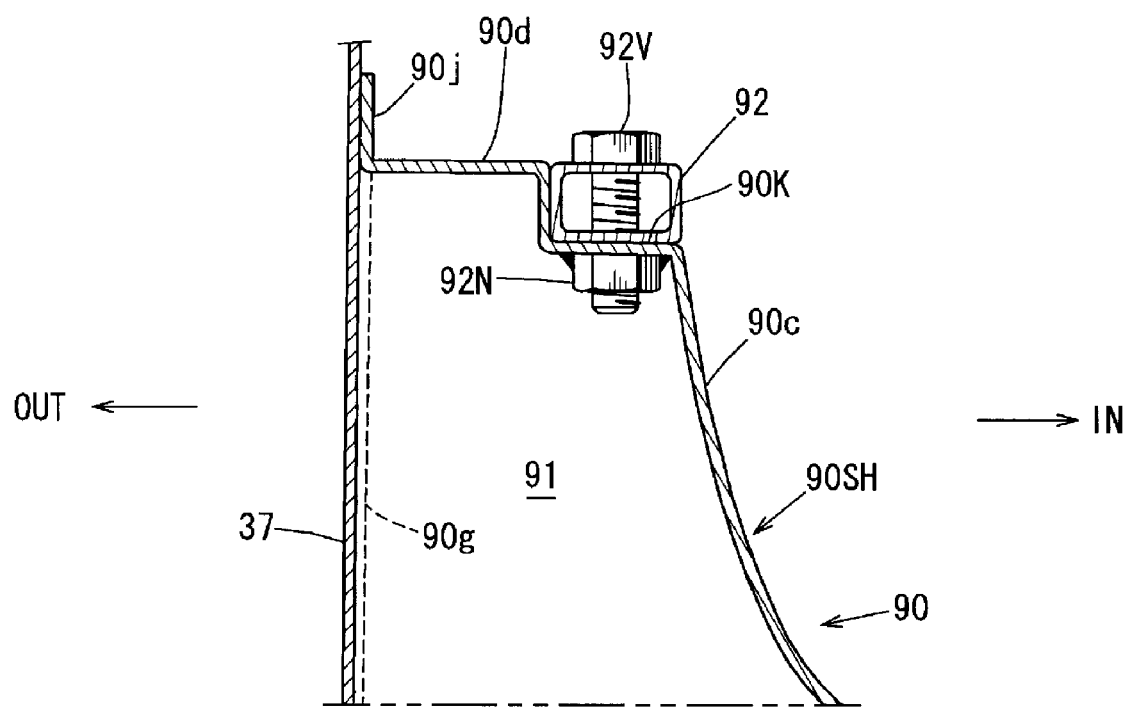
FIG. 24 is a partial enlarged sectional view showing an example of attaching structure of the shoulder anchor bracket to the rear side gusset.

Further, as shown in FIGS. 19 through 22, there is provided a rear side gusset 90 which extends vertically and interconnects a side portion of a horizontal portion 13H of the rear bulkhead 13 and a rear quarter-panel inner 37 as a rear side panel. This rear side gusset 90 comprises, as shown in FIG. 23, a front piece 90a, a rear piece 90b, a side piece 90c which connects the both pieces 90a, 90b, and an upper piece 90d. Further, a joint flange 90e is formed integrally at the front piece 90a on the vehicle outside, a joint flange 90f is formed integrally at the lower end of the front piece 90a, and a joint flange 90g is formed integrally at the rear piece 90b on the vehicle outside. Moreover, a joint flange 90h is formed integrally at the lower end of the rear piece 90b, a joint flange 90i is formed integrally at the lower portion of the side piece 90c on the vehicle inside, and a joint flange 90j is formed integrally at the upper portion of the upper piece 90d on the vehicle outside.

Figure 21:
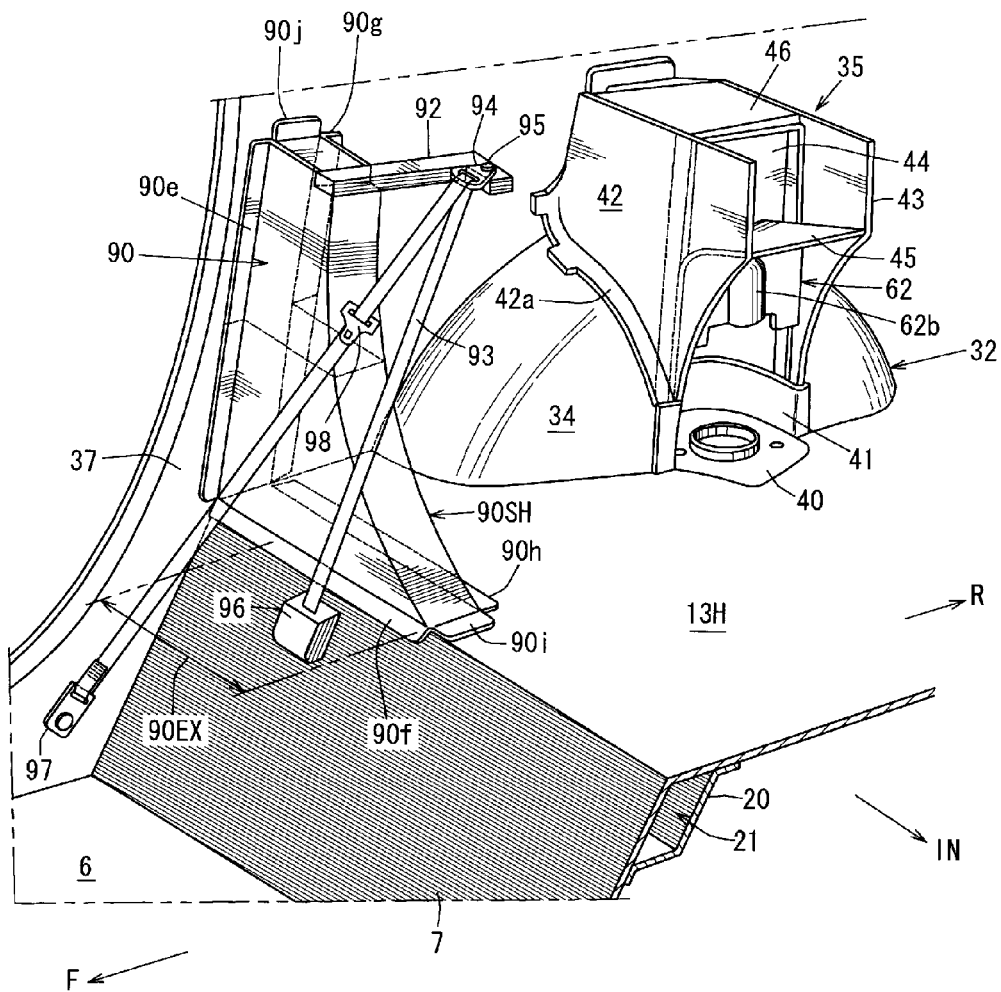
FIG. 21 is a perspective view of a major portion of FIG. 19.

Herein, as shown in FIGS. 21 and 22, the joint flanges 90e, 90g, 90j are joined to the rear quarter-panel inner 37 as the rear side panel, the joint flange 90 is joined to the kick-up portion 7, and the joint flanges 90h, 90i are joined to the horizontal portion 13H of the rear bulkhead 13. Thus, the rear side gusset 90 is provided so that a closed cross section 91 (see FIG. 22) is formed by the horizontal portion 13H of the rear bulkhead 13 and the rear quarter-panel inner 37. Further, as shown in FIGS. 21 and 22, the rear side gusset 90 is provided at the position which corresponds to the side end portion of the above-described rear cross member 20 which is formed at the horizontal portion 13H of the rear bulkhead 13 and extends in the vehicle width direction as a vehicle-body rigidity member.

Further, as shown in FIGS. 21 and 23, the rear side gusset 90 extends vertically along the rear quarter-panel inner 37 and includes an extension portion 90EX which extends in the vehicle width direction along the rear cross member 20. As shown in FIG. 23, the rear side gusset 90 includes a retreat portion 90SH at its inside portion which prevents its interference with the roof RO (rear roof 5) which is stored in the roof-storage space 14. Herein, the side piece 90c of the rear side gusset 90 is formed in a curve shape so as to be concave relative to a line Y connecting the upper and lower ends of the side piece 90c as shown in FIG. 23. This concave structure forms the retreat portion 90SH.

Further, as shown in FIG. 23, the upper piece 90d of the rear side gusset 90 includes a concave attaching portion 90k on the vehicle inside. A shoulder anchor bracket 92 is attached to this attaching portion 90k as a reinforcing member via a fastening means such as a bolt 92V and a nut 92N or a welding means as shown in FIGS. 21 and 22. The shoulder anchor bracket 92 may be made of a rectangular pipe. This shoulder anchor bracket 92, which is a bracket for fixing a shoulder anchor 94 of a seatbelt 93 for the passenger seated in the seat 19, is joined to the attaching portion 90k at the upper portion of the rear side gusset 90 at its front portion. The shoulder anchor bracket 92 is configured to extend rearward, and the shoulder anchor 94 is provided at the upper face of a rear portion of the shoulder anchor bracket 92 via an attaching member 95. In the present embodiment, the shoulder anchor bracket 92 is formed in an L shape in the plan view, and the shoulder anchor bracket 92 bends inward at its rear portion and the above-described shoulder bracket 94 is attached to the upper face of this inward bent portion of the bracket 92.

Moreover, a retractor device 96 which winds up the seatbelt 93 is provided. As shown in FIGS. 21 and 22, this retractor device 96 is attached to a high-rigidity portion of the lick-up portion 7 which corresponds to the above-described rear cross member 20. Meanwhile, as shown in FIG. 21, a lap anchor 97 is attached to the body side (vehicle-body inner wall) near the floor panel 6. The seatbelt 93 (so-called webbing), which is coupled to the lap anchor 97, extends downward passing through a belt guide hole of the shoulder anchor 94 and connects to the above-described retractor device 96. Further, a tongue 98 is applied at the middle of the seatbelt 98, and the tongue 98 engages with a buckle (not illustrated) on the side of the seat cushion 19C. Thus, three point type of seatbelt device is provided to restrain the passenger.

Herein, as shown in the side view of FIG. 19, a rear end of the upper-side door impact bar 58 is provided so as to overlap with the rear side gusset 90 when viewed from the side. In FIG. 22, a floor frame 99 is a rigidity member which is joined to the lower face of the floor panel 6 and extends longitudinally.

According to the present embodiment, there is provided the rear side gusset 90 which extends vertically and interconnects the side portion (specifically, the side portion of the horizontal portion 13H) of the rear bulkhead 13 and the rear side panel (see the rear quarter-panel inner 37) (see FIGS. 19 and 21). Thereby, improvements of resistance against the vehicle side crash, vehicle-body rigidity and vehicle-body torsional rigidity can be achieved without any conventional cross bar. Further, since no cross bar is provided, the roof-storage space 14 can be properly enlarged.

Further, the rear side gusset 90 includes the closed cross section 91 which is formed by the rear bulkhead 13 and the rear side panel (see the rear quarter-panel inner 37) (see FIG. 22). Thereby, the vehicle-body rigidity, the resistance against the vehicle side crash, and the vehicle-body torsional rigidity can be further improved.

Moreover, the rear cross member 20 which extends in the vehicle width direction is provided at the rear bulkhead 13, and the rear side gusset 90 is provided at the position which corresponds to the side end portion of the rear cross member 20 (see FIG. 21). Thereby, the vehicle-body rigidity is improved, in particular, the impact load caused by the vehicle side crash can be transmitted to the rear cross member 20 properly, thereby achieving the improvement of the resistance against the vehicle side crash. Further, the vehicle-body rigidity can be further improved by the synergy effect of the rear cross member 20 and the rear side gusset 90.

In addition, the rear side gusset 90 extends vertically along the rear side panel (see the rear quarter-panel inner 37) and includes the extension portion 90EX which extends in the vehicle width direction along the rear cross member 20 (see FIGS. 21 and 23). Thereby, the extension portion 90EX with a laterally long span receives the side-impact load, so that the resistance against the vehicle side crash can be improved and the improvements of the vehicle-body rigidity and the vehicle-body torsional rigidity can be achieved.

The rear side gusset 90 also includes the retreat portion 90SH at its inside portion which prevents any interference thereof with the roof RO which is stored in the roof-storage space 14 (see FIGS. 21 and 23). Thereby, any improper interference between the roof RO (the rear roof 5) stored in the roof-storage space 14 and the rear side gusset 90 can be prevented.

Further, the door 55 is provided at the side of the vehicle compartment 1 to be openable, and the rear end of the door impact bar 58 which extends longitudinally inside the door 55 is provided so as to overlap with the rear side gusset 90 when viewed from the side (see FIG. 19). Thereby, the door 55 can be prevented from moving inward improperly at the vehicle side crash. Further, the impact load caused by the vehicle side crash can be transmitted to the rear side gusset 90 properly, thereby achieving the further improvement of the resistance against the vehicle side crash.

Figure 25:
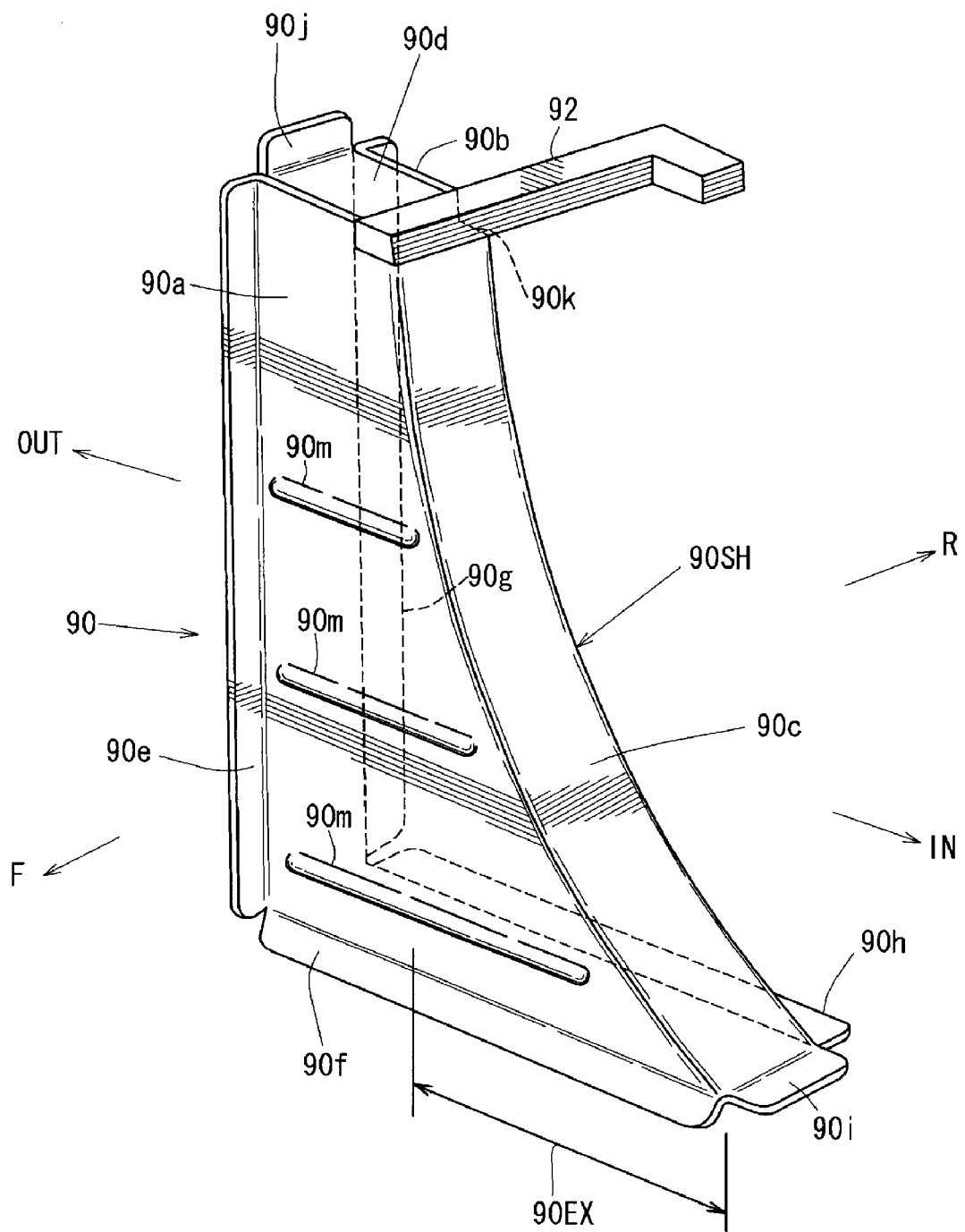
FIG. 25 is a perspective view of a modification of the rear side gusset.

FIG. 25 shows a modification of the rear side gusset 90. Herein, plural beads 90m . . . which extend in the vehicle width direction are formed at the rear side gusset 90. Thereby, the strength of the rear side gusset 90 can be improved without increasing the parts number, and in particular, the resistance against the vehicle side crash can be further improved.

The present invention should not be limited to the above-descried embodiments. For example, there may be provided a biasing means for biasing the link 73A in the direction of opening of the rear roof 5 with a small biasing force, specifically a coil spring disposed between the support axis 74 and the link 73A. Thus, a tension of the roof RO in the roof-closed state may be ensured, and the roofs 4, 5 may be moved with the small biasing force of this biasing means when the roof RO is opened.

What is claimed is:

1. A roof opening structure for a vehicle, comprising:
a front header extending in a vehicle width direction in front of a passenger's seat arranged in a vehicle compartment and supporting an upper side of a windshield;
a roof extending rearward from said front header and forming an upper portion of the vehicle compartment, the roof being split into plural parts in a vehicle longitudinal direction and openable and comprising a rearmost roof part and at least one front roof part, the at least one front roof part being positioned in front of the rearmost roof part when the roof is closed;
a trunk room formed at a rear end portion of the vehicle, an upper space of which is covered with an openable trunk lid, the trunk room being partitioned, in the vehicle longitudinal direction, from the vehicle compartment by a rear bulkhead forming a rear end of the vehicle compartment;
a roof-storage space formed between the passenger's seat and the rear bulkhead, in which said roof is stored when the roof is open; and
a support mechanism supporting said roof relative to a vehicle body,
wherein said support mechanism comprises a first link which couples said rearmost roof part to the vehicle body, and a second link which couples said at least one front roof part to the rearmost roof part and supports the roof comprising the at least one front roof part and the rearmost roof part in a roof-closed state where the roof covers over the vehicle compartment and in a roof-open state where the roof is stored in said roof-storage space partitioned from the trunk room, and
said first link of the support mechanism in the roof-closed state is configured such that a front end thereof is rotatably supported via a support axis at a specified position of the vehicle body which is located behind the passenger's seat, and a rear end thereof extending substantially rearward and upward is connected to the rearmost roof part, whereby an upper space of the roof-storage space between the passenger's seat and the rear bulkhead is covered with the stored at least one front roof part extending substantially horizontally and the rearmost roof part is stored inside the roof-storage space at a specified level below said support axis of the first link in a forward-slant position thereof where a level of a front end of the stored rearmost roof part is lower than that of a rear end of the stored rearmost roof part.

2. The roof opening structure for a vehicle of claim 1, wherein said roof comprises a front roof and a rear roof which are split from each other.

3. The roof opening structure for a vehicle of claim 2, wherein said roof is configured so that the rear roof is moved upside down and stored inside the roof-storage space and the front roof is moved rearward and above the rear roof, keeping a position thereof, and covers over the roof-storage space.

4. The roof opening structure for a vehicle of claim 2, wherein said front roof is supported by said supporting mechanism so as to be moved rearward, keeping a forward-slant position thereof.

5. The roof opening structure for a vehicle of claim 1, wherein a rollover protecting member is provided at a vehicle-body rear deck portion, the height of the rollover protecting member being set so that a line connecting an upper end of the rollover protecting member and an upper end of said front header is positioned so as to protect an passenger in the vehicle compartment.

6. The roof opening structure for a vehicle of claim 5, wherein the height of said rollover protecting member is set so that the line connecting the upper end of the rollover protecting member and the upper end of the front header is positioned at a level higher than an upper end of the seat.

7. The roof opening structure for a vehicle of claim 5, wherein said rollover protecting member comprises a member which extends in the vehicle width direction.

8. The roof opening structure for a vehicle of claim 5, wherein said rollover protecting member comprises plural members which are away from each other in the vehicle width direction.

9. The roof opening structure for a vehicle of claim 5, wherein the vehicle-body rear deck portion comprises a rear deck member which is a rigidity member extending in the vehicle width direction, and said rollover protecting member is provided at a position which corresponds to the rear deck member.

10. The roof opening structure for a vehicle of claim 5, wherein said rollover protecting member is provided at the vehicle-body rear deck portion which is positioned above a rear wheel house.

11. The roof opening structure for a vehicle of claim 10, wherein an upper end of a damper which is coupled to a rear wheel is supported at an upper portion of the rear wheel house.

12. The roof opening structure for a vehicle of claim 10, wherein a wheel-house reinforcement is provided at the rear wheel house.

* * * * *